(12) United States Patent
Brinker

(10) Patent No.: US 10,766,042 B1
(45) Date of Patent: Sep. 8, 2020

(54) SEALANT OR ADHESIVE DISPENSING SYSTEM

(71) Applicant: HAECO INC., Loveland, OH (US)

(72) Inventor: Timothy J. Brinker, Winchester, OH (US)

(73) Assignee: HAECO INC., Loveland, OH (US)

( * ) Notice: Subject to any disclaimer, the term of this patent is extended or adjusted under 35 U.S.C. 154(b) by 0 days.

(21) Appl. No.: 16/360,967

(22) Filed: Mar. 21, 2019

Related U.S. Application Data

(60) Provisional application No. 62/645,998, filed on Mar. 21, 2018.

(51) Int. Cl.
*B05B 1/30* (2006.01)
*E06B 3/56* (2006.01)
*G01P 3/36* (2006.01)
*B05C 5/02* (2006.01)

(52) U.S. Cl.
CPC ............... *B05B 1/30* (2013.01); *B05C 5/02* (2013.01); *E06B 3/56* (2013.01); *G01P 3/36* (2013.01)

(58) Field of Classification Search
None
See application file for complete search history.

(56) References Cited

U.S. PATENT DOCUMENTS

| | | | |
|---|---|---|---|
| 5,421,941 A * | 6/1995 | Allen | B05C 11/1026 156/244.11 |
| 6,149,076 A * | 11/2000 | Riney | B05B 7/0861 239/135 |
| 6,170,760 B1 * | 1/2001 | Bievenue | B05B 7/066 239/296 |
| 6,227,455 B1 * | 5/2001 | Scott | B05B 1/30 239/1 |
| 6,491,235 B1 * | 12/2002 | Scott | B05B 1/30 239/206 |
| 6,719,846 B2 * | 4/2004 | Nakamura | A61F 13/15593 118/302 |
| 6,899,288 B2 * | 5/2005 | Filicicchia | B05B 7/0884 239/424 |
| 7,934,465 B1 | 5/2011 | Brinker | |
| 7,963,246 B1 | 6/2011 | Brinker | |
| 9,394,097 B2 * | 7/2016 | Ineichen | B65D 83/28 |

(Continued)

*Primary Examiner* — Jethro M. Pence
(74) *Attorney, Agent, or Firm* — Daniel F. Nesbitt; Hasse & Nesbitt LLC

(57) ABSTRACT

A dispensing nozzle assembly for dispensing a flowable liquid through a nozzle, incorporating a rotating tube assembly. The dispensing nozzle assembly includes a nozzle coupling for supplying the flowable liquid, and a cylindrical nozzle tube having an inlet end connected to the nozzle coupling, and an outlet end attached to a dispensing nozzle. A union housing is secured to the nozzle coupling, and has a top opening through which the nozzle coupling extends, and an interior space that accepts and surrounds the nozzle coupling. The rotating tube assembly also includes a rotatable, cylindrical outer tube that surrounds the nozzle tube, which has an inlet end that extends into union housing, and an outlet end that extends proximate the outlet end of the nozzle tube. The inlet end of the rotatable outer tube that extends into union housing and is secured rotatably by a pair of spaced-apart, axially-aligned shaft bearings.

18 Claims, 18 Drawing Sheets

(56) References Cited

U.S. PATENT DOCUMENTS

| | | | |
|---|---|---|---|
| 2004/0081759 A1* | 4/2004 | Maruyama | B05C 5/0216 |
| | | | 427/256 |
| 2018/0161794 A1* | 6/2018 | Adamsson | B05B 13/0278 |
| 2018/0207661 A1* | 7/2018 | Klinefelter | B05B 1/30 |
| 2018/0251990 A1* | 9/2018 | Sasaki | B25B 11/007 |
| 2018/0264506 A1* | 9/2018 | Ikushima | B05C 5/00 |
| 2018/0272370 A1* | 9/2018 | Vijay | B05B 1/30 |
| 2019/0054488 A1* | 2/2019 | Wildt | A62C 35/68 |

* cited by examiner

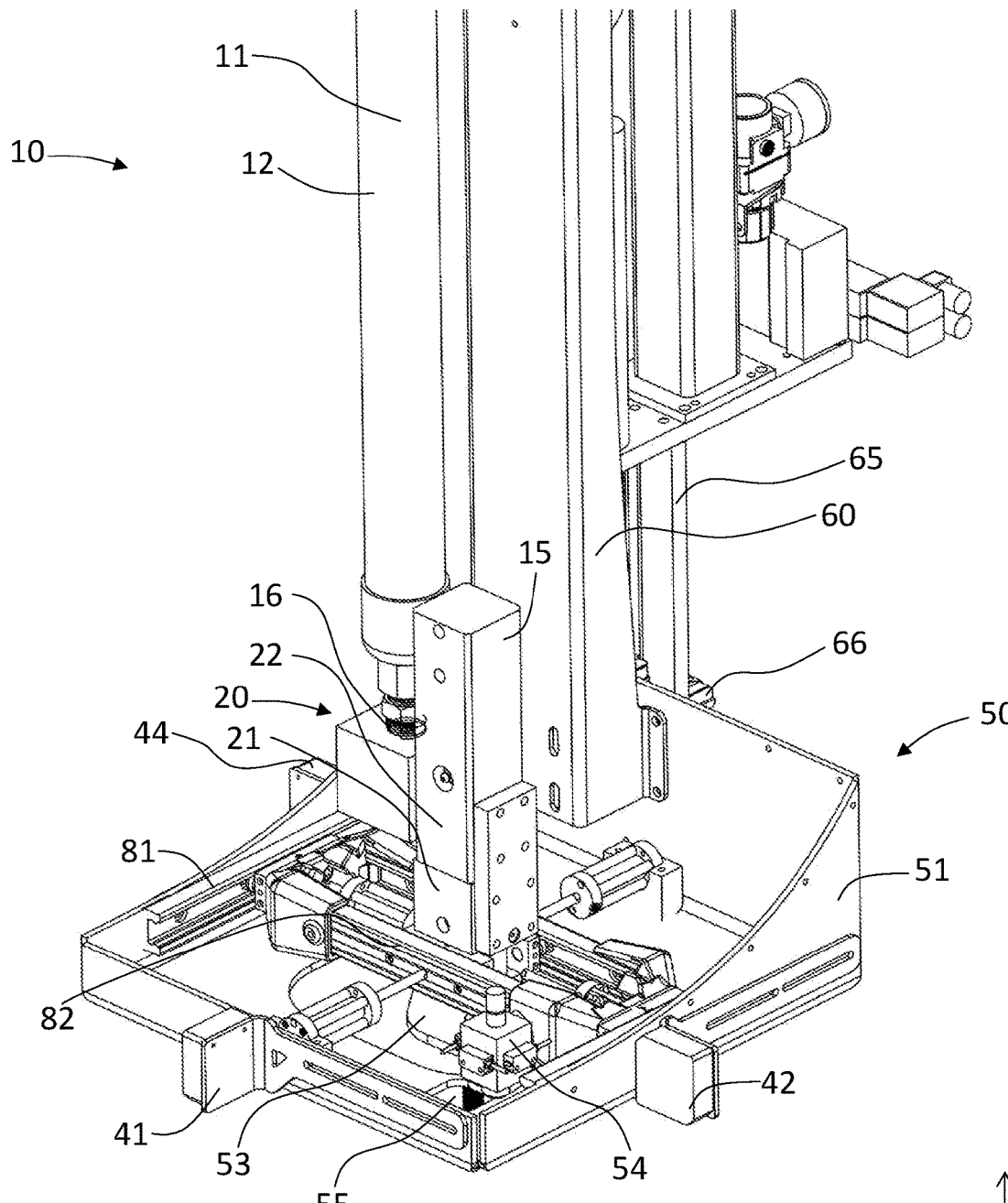
FIG. 1
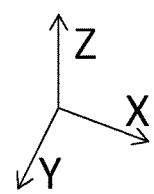

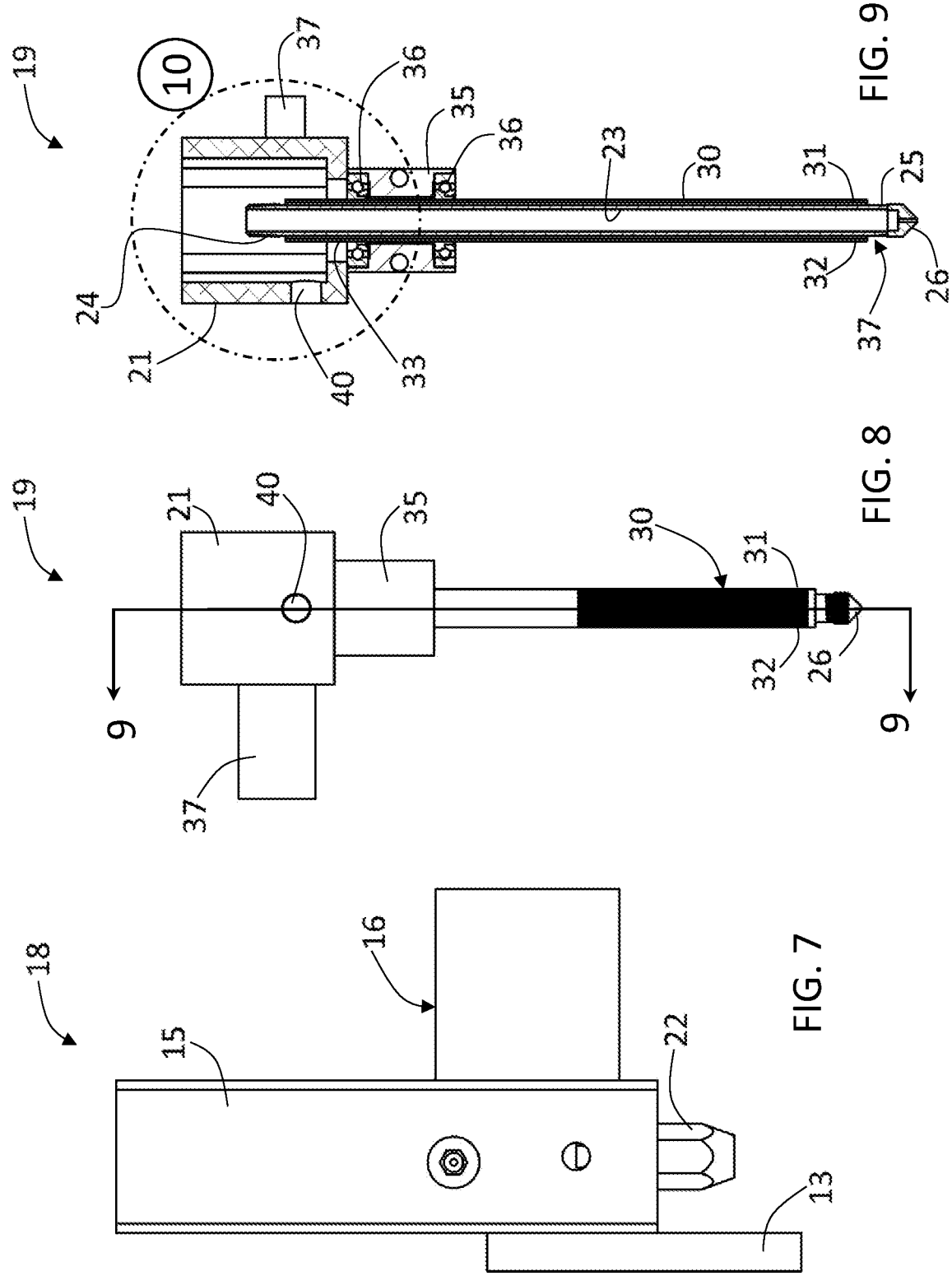

SEALANT OR ADHESIVE DISPENSING SYSTEM

CROSS-REFERENCE TO RELATED APPLICATION

This application claims the benefit of U.S. Provisional Patent Application 62/645,998 filed Mar. 21, 2018, the disclosure of which is incorporated herein by reference in its entirety.

FIELD OF THE INVENTION

This invention relates to an apparatus for and method of dispensing and applying an adhesive or a sealant to window frame.

BACKGROUND OF THE INVENTION

Methods of applying an adhesive or sealant material to a certain area, such as an edge, of a frame, such as a window frame, are well known. For example, there is a hand or manual method were the user manipulates the applicator device by pressure to dispense the material while moving the applicator along the frame using the senses of touch and feel. However, such a method is not automatable and relies on the operator to maneuver the applicator against the frame at whatever chosen dispensing pressure.

An apparatus of the prior art may employ an interpolation of X and Y speed references through an encoder for determining the speed and movement of a fluid dispenser, but does not employ a rotating nozzle or tubing member.

An apparatus of the prior art may employ robotics or machines that move in an X-Y orientation to move along the side and end members of the frame, but such machines and robotics do not detect for or account for irregularities, such as bowing of the frame member inwardly or outwardly, when dispensing the fluid material.

There are optical sensor systems that look for the corners of a frame to maneuver the applicator along the 90 degree turn in the frame, but the methods and apparatuses of the prior art have multiple operational problems with optical sensing of the members and corners of frames due to color, sheen, backgrounds, sensor adjustments, and others, which can result frequently in the breaking of nozzles.

There has been provided in the past the addition of "dumb" compensating devices that follow inconsistencies in a frame member but do not provide electrical feedback to a controller.

A method of the prior art is believed to force a member of a frame that is bowed, into fixtures to align the members with a predetermined path. There are also systems that look at the frame members' positions using a camera, and then create a path along which the applicator follows that particular frame member's position. These systems have problems with large views such as found in typical windows and doors.

Hand assist glazing tables are known, whereby a window frame is clamped to a table framework in a horizontal or vertical (art easel fashion) position. The framework supports a gantry slide system that is responsible for hand moving a dispensing valve with an extended non-rotating dispensing nozzle inside, against and around the inner portions of the vertical and perpendicular legs of a window frame of any shape. The inertia of the moving dispensing gantry can be significant, and the pressure exerted against the frame is operator-dependent. The non-rotating nozzle, along with the significant operator-created force and inertia of the dispensing valve, and various frictional forces exerted by the side edge of the frame against the nozzle, can result in marring or damaging the frame as well as damaging the nozzle. In order to maintain a consistent volume of dispensed sealant or adhesive material, the X and Y linear encoder frequencies are interpolated to determine the vector speed of the nozzle in any direction. This information is used to control a metering pump to produce a similar volume of dispensed material regardless of line speed. Due to the nature of the dispensed material, the start and stop volumes in the corners have separate adjustment.

Automated tracing tables move the nozzle automatically by motors and drives similar to hand glazing but have stopping points that generally do not touch the frame and are limited to rectangular shapes. Therefore bowed and "out-of-square" frames have dispensed adhesive or sealant material that can be dispensed at different distances from the ledge of the frame. It is known to use a spring-loaded nozzle compensator that enables a non-rotating dispensing nozzle to ride against the frame of slightly bowed or "out-of-square" windows. This compensator is very limited in performance due to the size and resulting design.

Automated glazing tables with dispensing recipes are known that are similar to the automated table above except they follow a predetermined path as chosen by a particular program recipe or from a barcode reading. The accuracy of the dispensed material is determined by the accuracy of the frame and/or the ability to fixture the frame into the predetermined path.

There remains a need for a method to follow the frame by touch with an automated prescribed pressure while applying a consistent volume of an adhesive or sealant to the surface of a frame member that is irregular in shape, form, or size.

SUMMARY OF THE INVENTION

The subject invention comprises a method and an apparatus to accurately and uniformly dispense a consistent volume of a flowable material along a specified application surface of a frame that has a congruent upright surface whereby the accuracy of the placement of the bead along the specified application surface is approved or improved. In particular, the invention provides, by moving the device in contact or touch with the upright perpendicular surface, to follow an irregularity in the orthogonality of the frame caused in manufacture, and to compensate for the irregularity while dispensing the flowable material along the application surface. The irregularity in the orthogonality of the frame can include a bowing of a side member of the frame out-of-square, resulting in dimensionally inconsistent windows and other similar structures.

Examples of a frame product and a flowable material that can require this type of dispensing, can include, in particular but not by limitation, windows and doors, and the dispensing of sealant and adhesive materials. A typical application can include sealing a pane of glass to a frame that is typical in the manufacturing of a window. However, the invention can be used in other industries whose products require adhesive and sealant dispensing on frame products that exhibit the same characteristics as window frames.

An embodiment of the present invention provides an automated tracing table, for accurately dispensing a uniform volume bead in a precise location on an edge of a severely bowed or out-of-square frame.

A further embodiment of the present invention provides a hand-held application that does not require discernment and skill of an operator to place a predetermined uniform bead of adhesive or sealant along a dispensing surface of a framed of any shape, while holding the nozzle of the dispensing device (gun) against a side of the frame.

Another embodiment of the present invention provides an accurate manual dispensing application in location and volume where the dispensing nozzle is positioned and fixed in a stationary position, while the frame is moved over the fixed nozzle. The frame is maintained against the nozzle either by gravity by rotating the frame held in a vertical position over the nozzle, or by a pulling force on the frame held in a horizontal position and rotated around the nozzle.

Another embodiment of the present invention provides a hand-assist table having a compensating device that utilizes a controlled, minimal amount of friction and an internal air-heated nozzle for maintaining operating temperature for heated sealant or adhesive materials.

Another embodiment of the present invention provides a dispenser having a frame member sensor that can detect, stop, and retract the nozzle when the dispensing system misreads the frame, thereby preventing the breaking of the frame or the dispensing nozzle.

Another embodiment of the present invention provides a sensor that detects the circumferential velocity of a rotating outer nozzle tube that determines accurately the linear speed of the dispensing nozzle, that cannot be achieved by the interpolation of X and Y encoders at the point when compensation occurs. When compensation occurs according to the prior art the X and y axis of the dispensing device is still moving, while the dispense nozzle is not. The method of using the X and Y encoder inputs of the prior art can cause puddling of adhesive in the corners of the frame.

Another embodiment of the present invention can further provide a hybrid table that combines the use of automation for rectangular windows, with the ability to switch to manual mode to do irregular shaped windows such as octagons, half rounds, and very tiny windows. The manual mode can be engaged either by disconnecting the dispenser drive, or moving the frame manually around a fixed nozzle positioned on the table.

In operation, the compensating device will ride along the irregularity of the frame as it dispenses flowable material such as sealant and adhesive, thereby keeping the same material application location regardless of inward or outward bowing of the side members of the frame. The compensating contacting device employs a rotating, independent outer tube that provides: diametrical sizing to meet the location requirement from the contact edge; low friction moving contact; stability as not to bend on contact; a conduit for heated air around the nozzle; and a target for non-contact speed measurement needed to accurately meter the volume of material dispense. Furthermore, in order to prevent nozzle damage, the design incorporates an over-travel detection means to stop movement before the compensator reaches a hard stop.

BRIEF DESCRIPTION OF THE DRAWINGS

FIG. 1 shows a front, top, and right-side perspective view of a compensating apparatus and a dispensing nozzle assembly for a flowable liquid such as sealant or adhesive.

FIG. 7 shows a side elevation view of an upper supply assembly of the dispensing nozzle assembly.

FIG. 8 shows a front elevation view of a lower nozzle assembly of the dispensing nozzle assembly.

FIG. 9 shows a sectional view of the lower nozzle assembly, taken through line 9-9 of FIG. 8.

Figure 2:
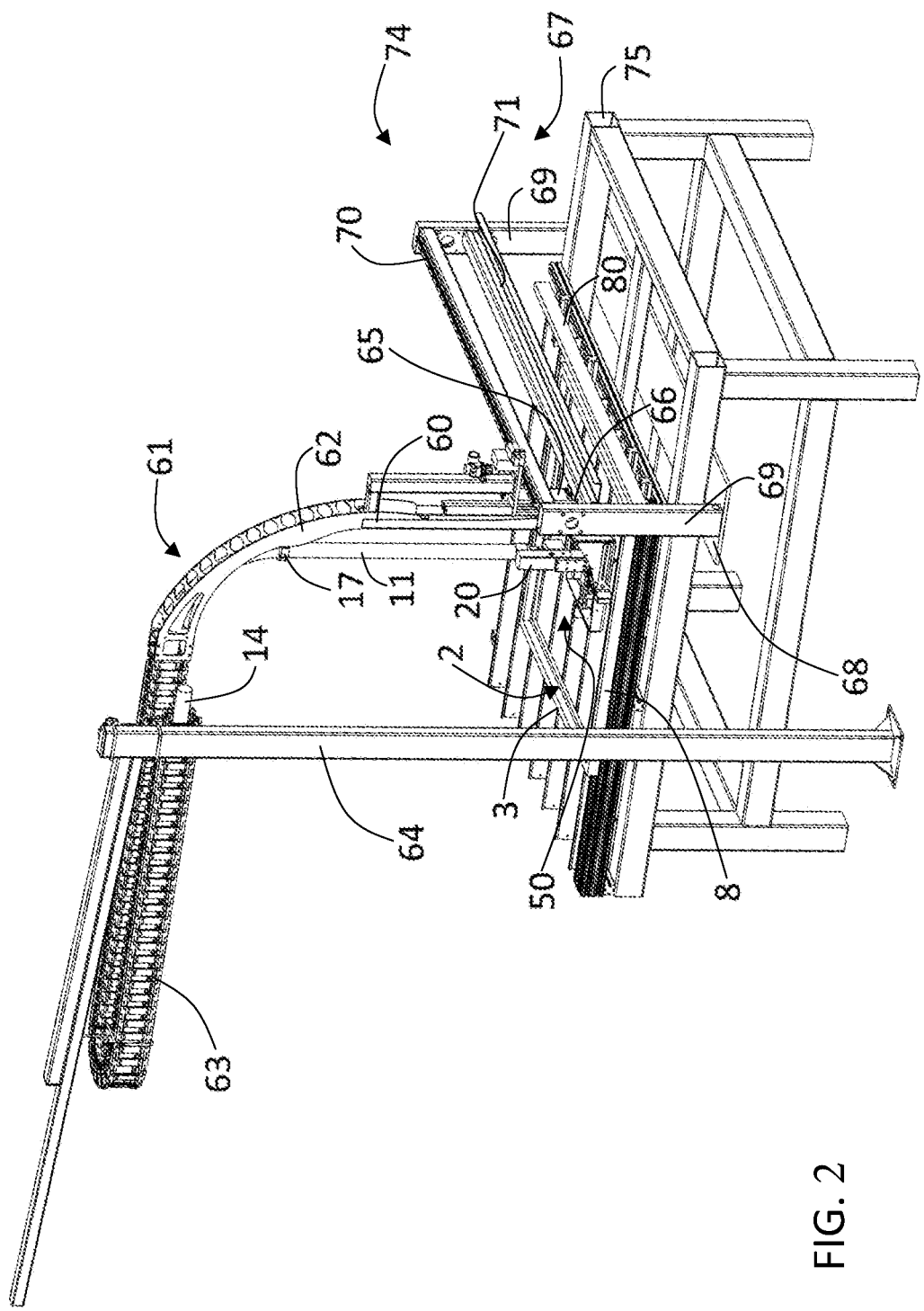
FIG. 2 shows a supply hose assembly for supporting and guiding the flowable liquid supply hose 11 to the dispensing nozzle assembly.

For purposes of completeness, numbers and associated parts are listed below. While not discussed in the specification, they are included here for a fuller understanding of the invention.

DETAILED DESCRIPTION OF THE INVENTION

FIG. 1 shows a front, top, and right-side perspective view of a dispenser 10 for a flowable liquid, and a compensating apparatus 50. A supply hose 11 supplies the flowable liquid to a dispensing nozzle assembly 20 mounted rigidly to a platform 51. The platform 51 is affixed rigidly to a bracket 65, which joins the dispenser 10 to an automated movement system 74, shown in FIG. 2, to move the platform in an X, Y and Z (laterally, longitudinally, and vertically) relative to a table 75.

In an embodiment of the invention, the automated movement system 74 includes lateral positioning assembly 67. The lateral positioning assembly 67 includes a moveable base 68, and a pair of upright supports 69 that extend upwardly from the moveable base 68 and above the top surface of the table 75. Extending between the upright supports 69 are an upper transverse conveyor 70 and a lower transverse track 71. The bracket 65 of the platform 51 is affixed via a pair of linear bearings 66, at the top and bottom ends of the bracket 65, to the upper transverse conveyor 70 and the lower traverse track 71, respectively. The linear bearing 66 provides bi-directional, lateral movement of the dispensing nozzle assembly 20 along the upper transverse conveyor 70, and over the table 75. The moveable base 68 that can be moved along the longitudinally (Y-direction) dimensions of the table 75, by well-known means, not shown.

As shown in FIG. 2, a supply hose assembly 61 guides the dispensing end 12 of the supply hose 11 along with the dispensing nozzle assembly 20 in the same X, Y, and Z movements of the platform 51. The dispensing end 12 of the supply hose 11 extends vertically from the dispensing nozzle assembly 20 and is clamped 17 rigidly to a rigid base support 62, which is in turn fixed rigidly to a support arm 60 that extends from and is fixed to the platform 51. The supply hose assembly 61 eliminates forces of the supply hose 11 from acting upon the movements and positioning of the compensating apparatus 50, the platform 51, and the dispensing nozzle assembly 20. The supply hose assembly 61 can include a support track 63 having linked segments extending from a support 64, for supporting and guiding the supply hose 11, from a supply end 14 to the dispensing end 12 of the supply hose 11. The support track 63 can also support other tubing, pipe and cables running to the dispenser 10, including hydraulic and/or pneumatic pressure lines, as described later in this specification.

FIG. 2 also shows the table 75 for positioning and supporting a frame 80, upon which the dispenser 10 applies a flowable material, typically a sealant or adhesive liquid. The support 64 is positioned adjacent the table 75, and the automated movement system 74 maneuvers the dispenser 10 in the X and Y directions, as well as the Z direction, over the table 75, and relative to the positioned frame 80.

Figure 3:
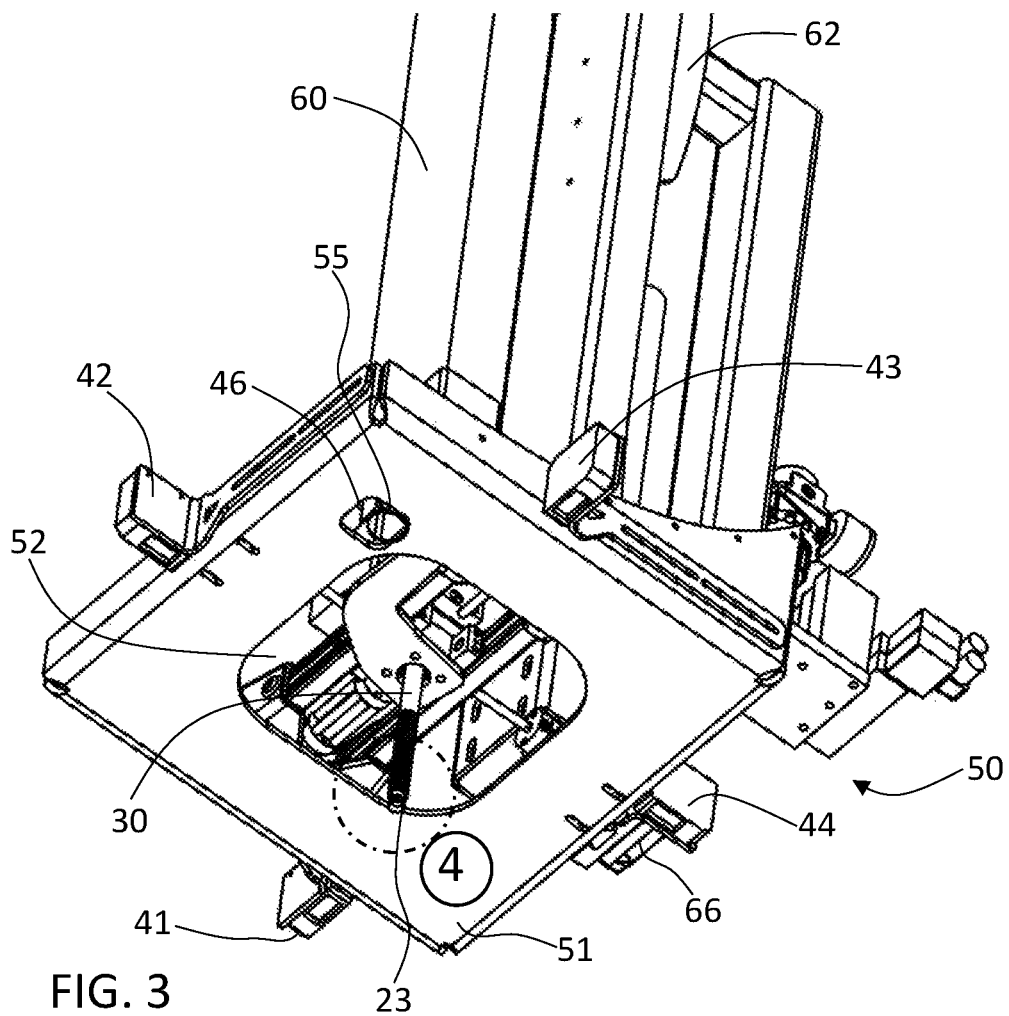
FIG. 3 shows a rear, underside, and right-side perspective view of the compensating apparatus, the dispensing nozzle assembly, and a platform, and a distal end of a rotatable outer tube of a rotating tube assembly for the nozzle.

FIG. 3 shows a rear, underside, and right-side perspective view of the dispenser 10, the compensating apparatus 50, and the platform 51, and shows a discharge end 25 of a nozzle tube 23 and a distal end 31 of a rotatable outer tube 30 that provides a rotating tube assembly. The rotating tube assembly extends a distance sufficient from the underside of the platform 51 to avoid interference contact by the platform 51 with the frame 80 or the table 75 as the distal end of the rotating tube assembly and the nozzle 26 is maneuvered along the frame 80.

Figure 6:
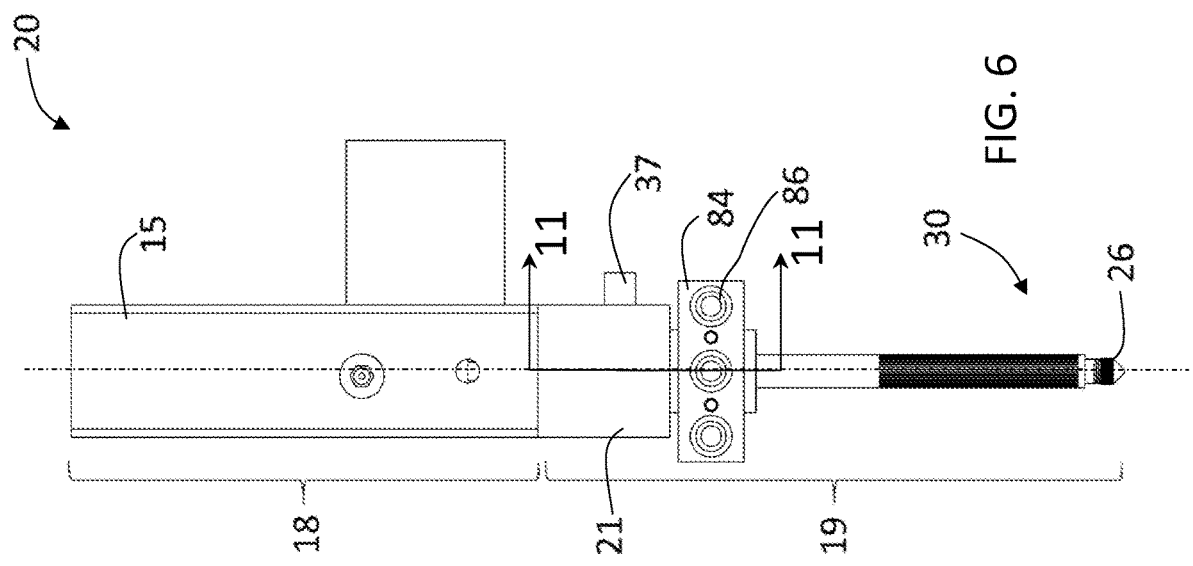
FIG. 6 show a rear elevation view of the dispensing nozzle assembly.
Figure 5:
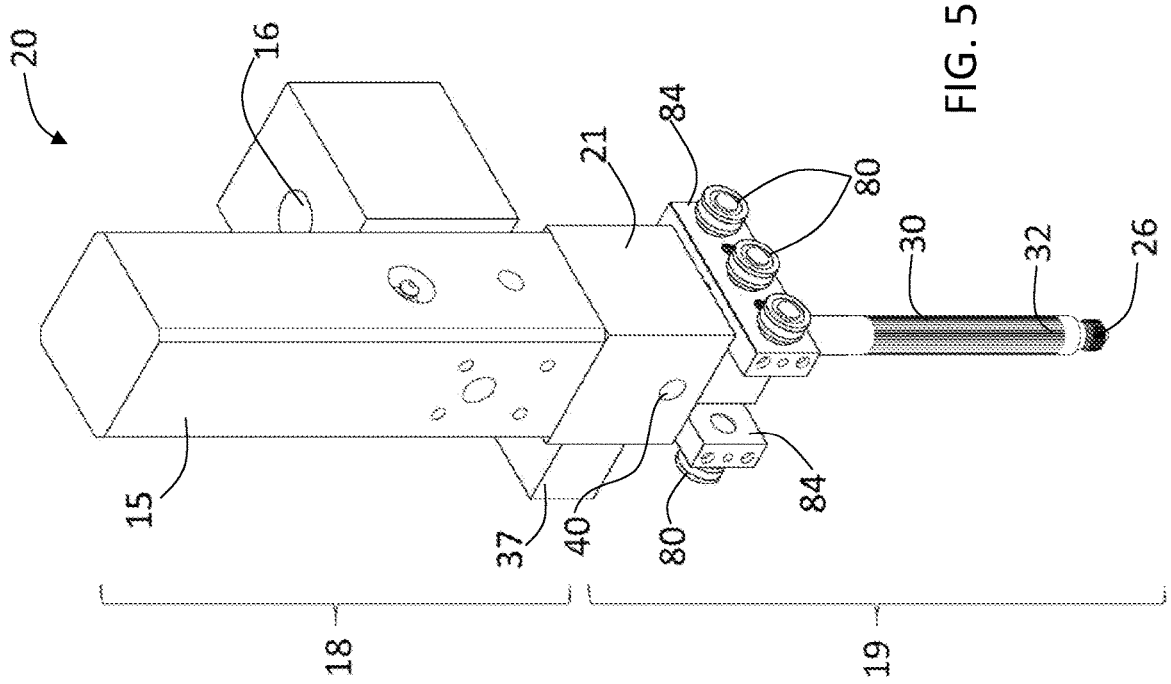
FIG. 5 shows a rear, right-side perspective view of the dispensing nozzle assembly.
Figure 10:
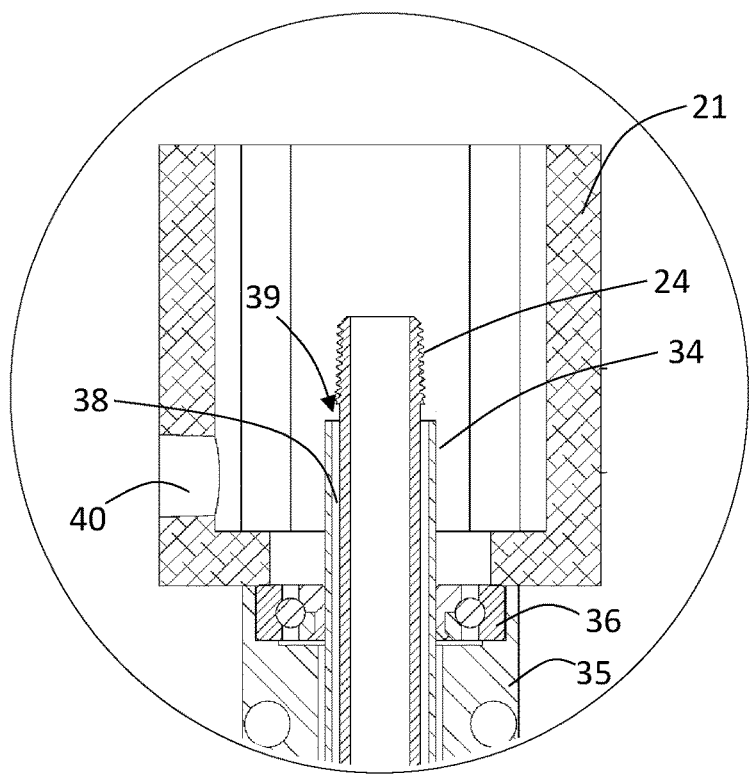
FIG. 10 shows a detailed view of an inlet end of the rotating tube assembly shown in FIG. 9.

FIGS. 5 and 6 show a rear, right-side perspective view and a rear elevation view of the dispensing nozzle assembly 20. The dispensing nozzle assembly 20 includes an upper supply assembly 18 assembled to a lower nozzle assembly 19. As shown in FIGS. 1 and 7, a plate member 13 is secured to a nozzle block 15, and extends downward for attachment of a union housing 21 of the lower nozzle portion 19.

The upper supply assembly 18 delivers the flowable material, typically a sealant or an adhesive, to the nozzle portion 19. The dispensing end 12 of the supply hose 11 is coupled to an inlet port 16 in a side member of the nozzle block 15, and is discharged from the upper supply assembly 18 through a port 28 in a nozzle coupling 22, shown in FIG. 7 and FIG. 11.

Figure 11:
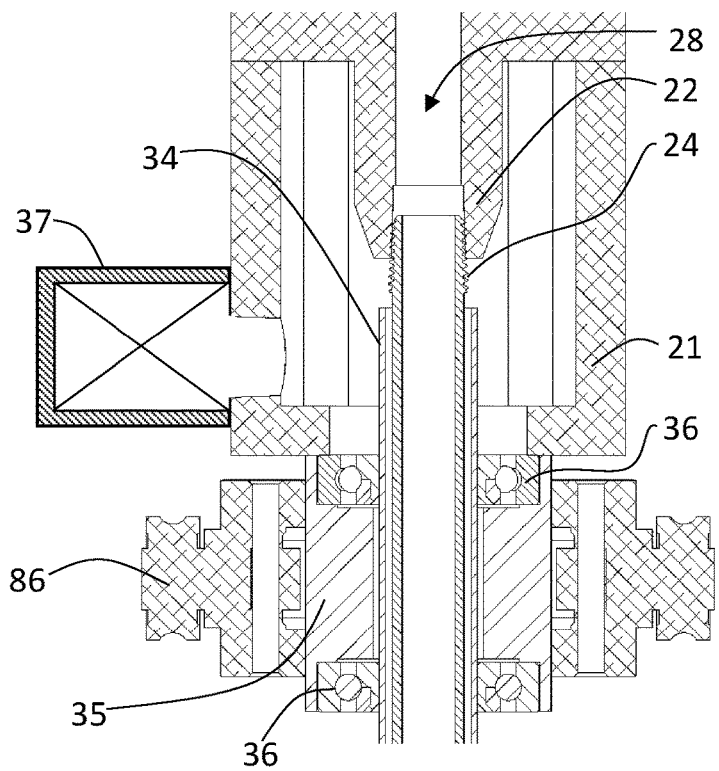
FIG. 11 shows a sectional view of the dispensing nozzle assembly, taken through line 11-11 of FIG. 6.

FIGS. 8-11 show the lower nozzle assembly 19. The lower nozzle assembly 19 includes the union housing 21 that secures the lower nozzle assembly 19 to the plate member 13. The union housing 21 includes a top opening, through which the nozzle coupling 22 extends, and an interior space that accepts and surrounds the nozzle coupling 22 (as shown in FIG. 11, and described herein after). The lower nozzle assembly 19 has attached and extending therefrom, and can include, a rotating tube assembly comprising a nozzle tube 23 and a rotatable outer tube 30. The rotatable outer tube 30 comprises an annular, rotatable cylinder of uniform inner wall diameter. The outer tube 30 surrounds the nozzle tube 23, while being freely rotatable. An inlet end of the outer tube 30 extends into union housing 21, while the opposed outlet end 31 extends proximate the discharge end 25 of a nozzle tube 23. As illustrated, the discharge end 25 of a nozzle tube 23 extends axially beyond the outlet end 31 of the outer tube. The nozzle coupling 22 includes a means for securely and rigidly attaching the inlet end 24 of the nozzle tube 23. As illustrated, the inlet end 24 of the nozzle tube 23 has outer threads for threaded mating with and sealingly connecting to the corresponding internal threads of the nozzle coupling 22, as shown in FIG. 11.

The union housing 21 includes an outer wall having an inlet port 40 for a heating fluid, described below, and an opening in a lower end through which the rotating nozzle assembly extends.

Figure 4:
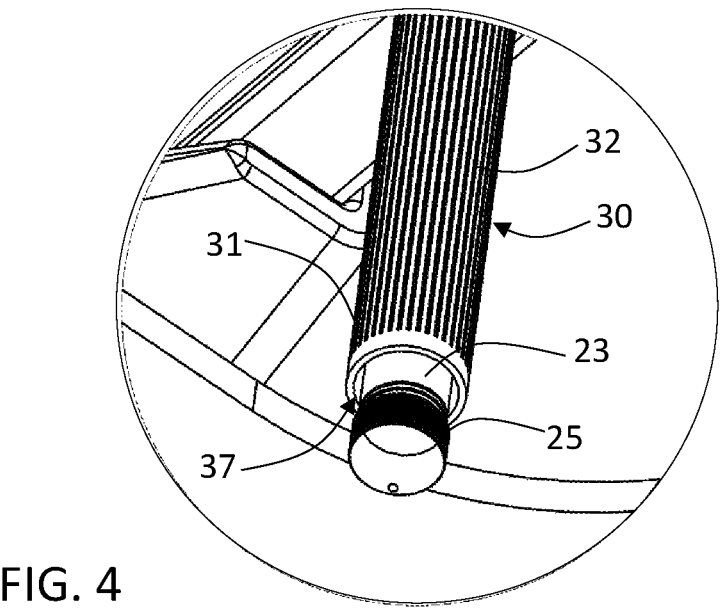
FIG. 4 shows a detailed view of the distal end of the rotatable outer tube and the nozzle of FIG. 3.

A bearing housing 35 is secured to at the lower end of the union housing 21, and includes a pair of spaced-apart, axially-aligned shaft bearings 36. The upper end 33 of the rotatable outer tube 30 extends through the bearing housing 35 in frictional engagement with the respective inner races of the pair of shaft bearings 36, to provide low friction or frictionless rotation of the rotatable outer tube 30 relative to the union housing 21. The spaced-apart pair of bearings maintain a constant axial alignment of the rotatable outer tube 30, and co-axiality of the rotatable outer tube 30 with the nozzle tube 23. The inner diameter of the rotatable outer tube 30 is configured to be larger than the outer diameter of the nozzle tube 23, to provide an annular gap 38 along the entire length of the rotatable outer tube 30, and defines an annular inlet 39 in communication through the annular gap 38 with an opposed annular outlet 37, also shown in FIG. 4. The annular gap 38 provides a clearance that allows the rotatable outer tube 30 to rotate frictionlessly around the nozzle tube 23.

The annular gap 38 also provides a passageway around the outer surface of the nozzle tube 23 for passing a fluid for heating (or cooling) the nozzle tube 23, and consequently, the flowable liquid passing through the nozzle tube 23 to the nozzle 26. The fluid is typically a heated air. In another embodiment, the fluid, typically air, can be used to feed a two-part nozzle. Accordingly, the invention provides for the use of ambient, heated, or two-part nozzles. Heated, pressurized air can be passed through tubing via the supply hose assembly 61, and connected to an inlet port 40 in the sidewall of the union housing 21. The heated air can also heat the union housing 21, while passing heated air through the annular gap 38 along the nozzle tube 23. The plate member 13 is also heated, and acts as a heat exchanger to transfer heat to the nozzle coupling 22.

The rotatable outer tube 30 is configured to have rigidity sufficient to withstand lateral forces that may impact the rotatable outer tube 30, as described hereinafter, that may damage the nozzle tube 23. A bending force exerted on the rotating tube assembly is substantially absorbed by the rotatable outer tube 30.

Figures 22, 23:
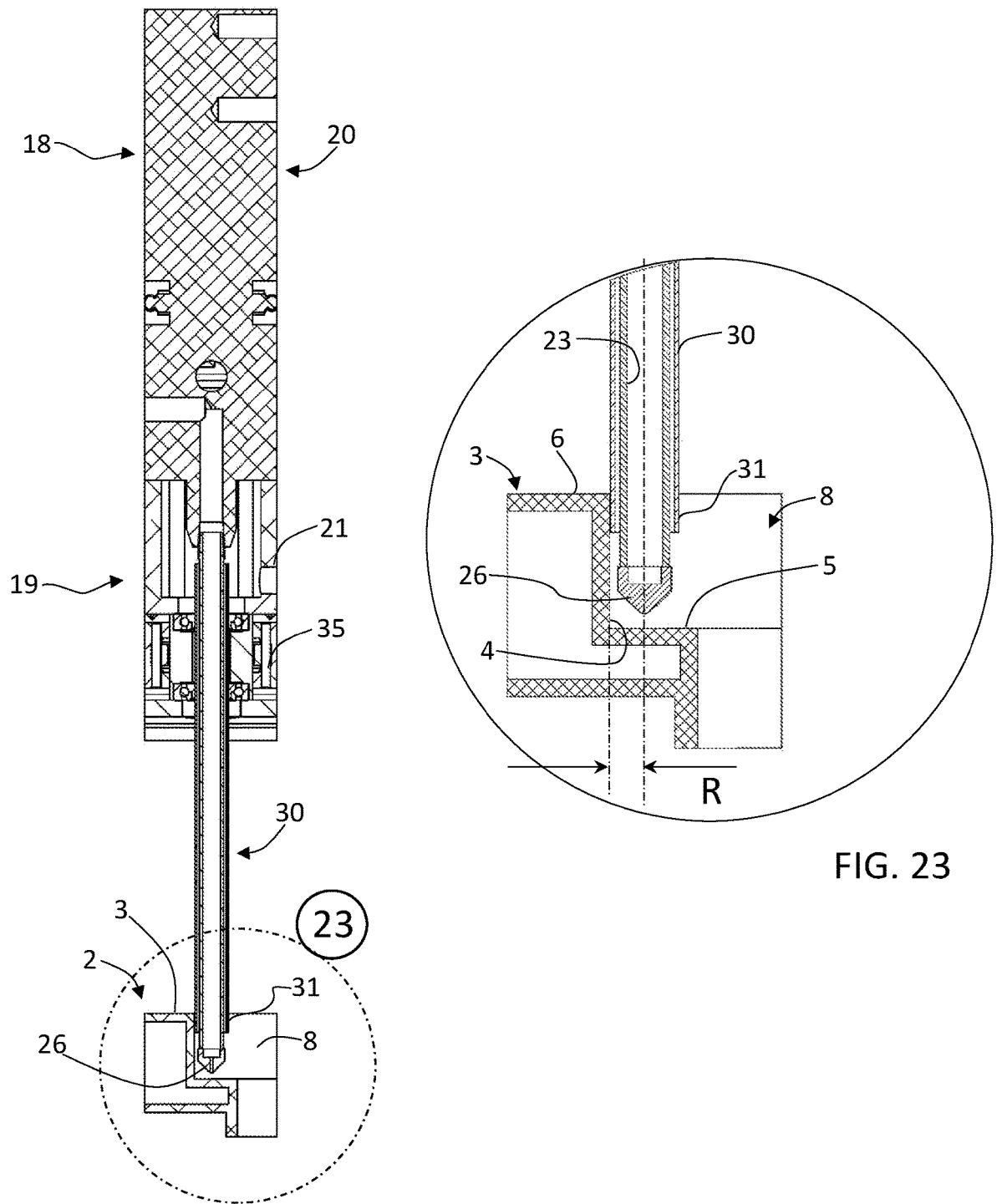
FIG. 22 shows a sectional view of the dispensing nozzle positioned along an end member of the frame, illustrating the rotating tube assembly riding along the upright surface of the side member and the nozzle positioned for dispensing the flowable liquid along the congruent application surface of the frame.
FIG. 23 shows a detailed view of the side member and the rotating tube assembly shown in FIG. 22.
Figure 24:
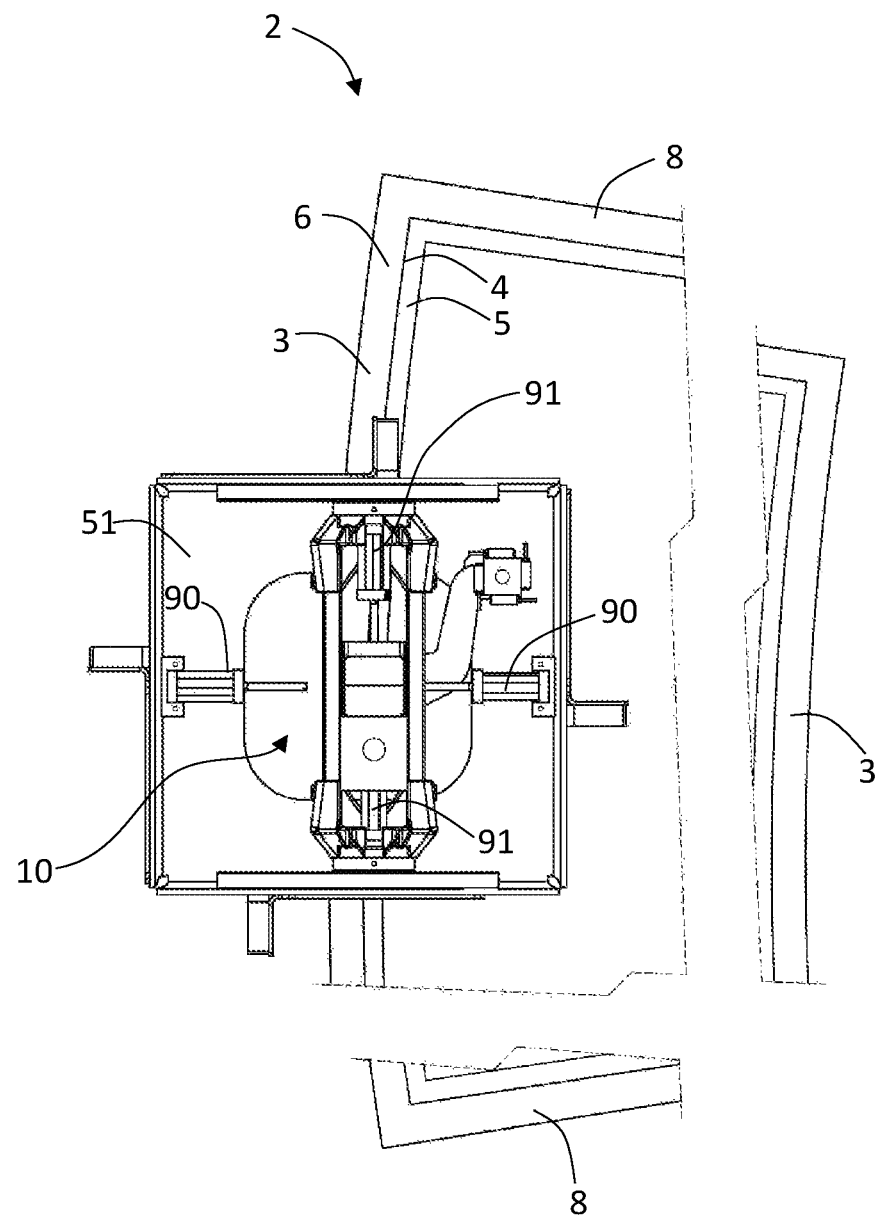
FIG. 24 shows a top plan view of the compensating apparatus and dispensing nozzle assembly moving along a bowed-out end member of the frame.

The distal end 31 of the rotatable outer tube 30 is configured to engage by touching an upright surface of the frame 2. FIG. 22 shows the dispensing nozzle assembly 20 being moved along a side member 3 of a frame 80, typically secured to a table 75 as shown in FIG. 1. While maneuvering the dispensing nozzle assembly 20 and the rotating nozzle assembly, including the nozzle 26, along a side member 3 of a frame 80, a plurality of optical detecting devices are used to detect the approach of the nozzle 26 toward a corner of the side member 3 with the adjacent side member 6. The plurality of optical detecting devices are illustrated as four detectors 41, 42, 43, and 44, positioned along and extending outward from the four sides of the outer periphery of the platform 51. A first pair of detectors 41 and 43 extend from the front and rear sides, respectively, of the platform 51 for detecting the approaching adjacent member 6 in advance as the nozzle 26 travels laterally in the X direction along the side member 3, and a second pair of detectors 42 and 44 extend from the right side and left side, respectively, of the nozzle tray 51 for detecting the approaching adjacent member 3 in advance when the nozzle 26 travels longitudinally in the Y direction along the side member 6. The sensors are configured and positioned to detect images and changes in the elevation of surfaces directly below the sensor. Constant and continuous contact of the rotatable outer tube 30 along the upright surface 4 of a side member of the frame 2, as shown in FIGS. 22-24, as the rotating nozzle assembly of the dispenser 10 is maneuvered along a side member 3 of the frame 2, provides a means for determining the instantaneous linear speed of the nozzle tube 23, and the nozzle 26, along a congruent application surface 5 of the frame 2, and therefore, for controlling the accuracy and uniformity of the application of the flowable material. In one embodiment, a non-contact velocity sensor 37 can detect the rotational speed of the rotatable outer tube 30, and particularly, the circumferential speed of the inlet (upper-most) end 34 of the rotatable outer tube 30, and thus, the linear velocity of the nozzle 26. The non-contact velocity sensor 37 applies no drag or friction to the rotating outer tube 30. In an embodiment of the invention, the velocity measuring means includes an optical detecting device that can read an outer surface of the inlet end 34 of the rotatable outer tube 30. In one embodiment, the outer circumference of the outer surface includes one or more, or a plurality of equally spaced-apart, markings (not shown), and the detector reads the rate of movement of the markings past a fixed optical point or position, providing instantaneous rotation speed of the outer tube 30 and, corresponding, linear velocity of the nozzle 26.

In another embodiment of the invention, the outer surface of the rotatable outer tube 30 defines a radius distance R that defines a correct or appropriate distance, as shown in FIG. 23, at which the nozzle 26 will apply the flowable material (e.g., the sealant) onto the application surface 5 of the side member 3 of the frame 2.

In a further embodiment, a frictional material can be applied to the distal end 31 of the outer tube 30. The material can be affixed permanently to the rotatable outer tube 30, or can be a removable or replaceable sleeve 32, as shown in FIGS. 5 and 8. The frictional material is preferable a resilient, compressible material, including natural or synthetic rubber or silicon, to prevent scratching, marring or denting of the upright surface 4 of the side member 3 of the frame 2 with which it makes contact. The frictional material also helps to ensure that the rotatable outer tube 30 does not slip or slide along the upright surface 4, thus helping to ensure that the detection of the rotational speed of the rotatable outer tube 30 provides an accurate linear velocity determination of the nozzle 26 along the upright surface 4.

Figure 12:
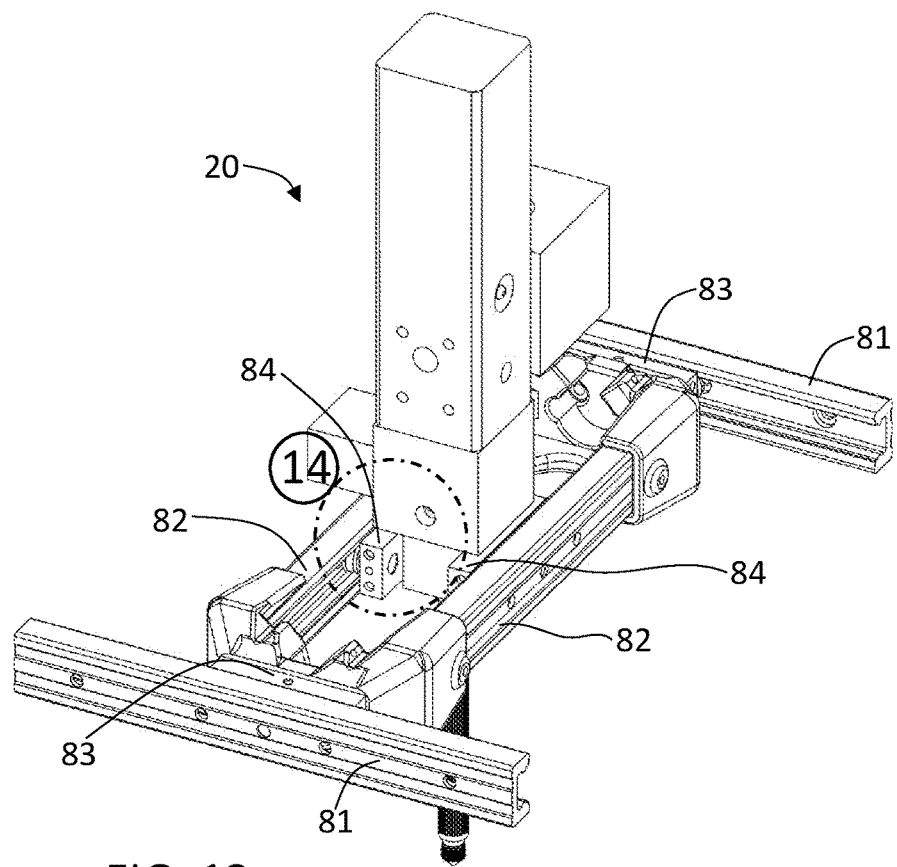
FIG. 12 shows a rear, top, and right-side perspective view of the dispensing nozzle assembly and the elements of the compensating apparatus.
Figure 13:
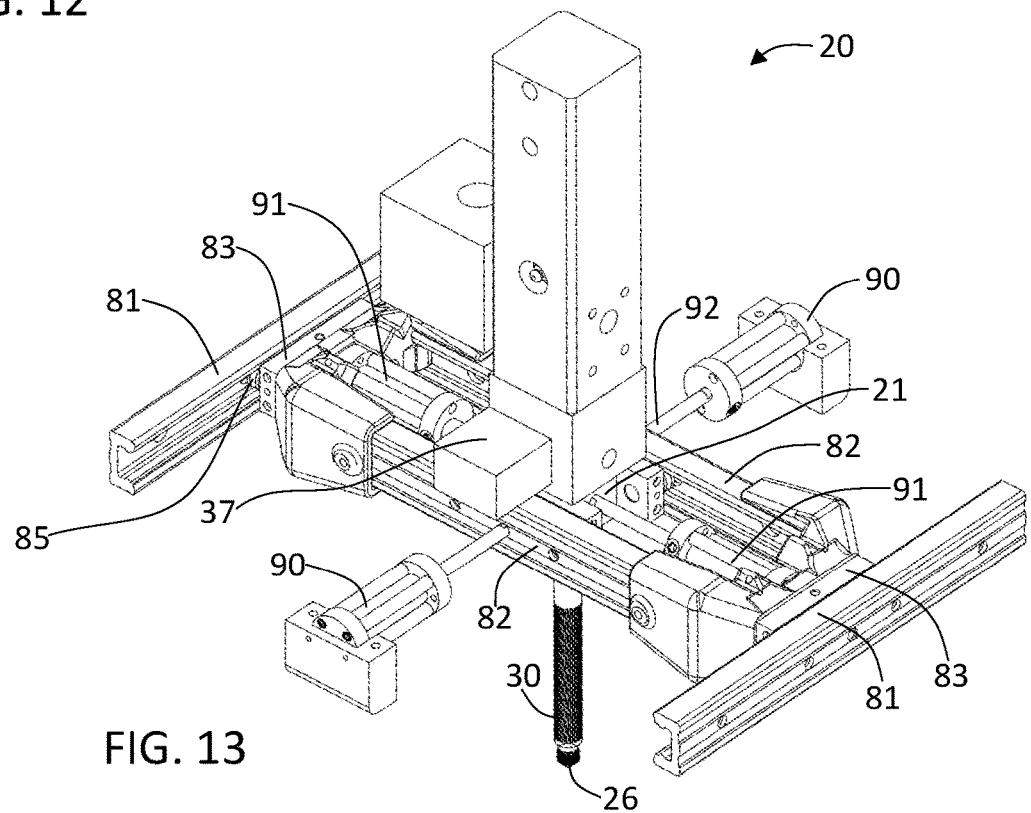
FIG. 13 shows a rear, top, and left-side perspective view of the dispensing nozzle assembly and the elements of the compensating apparatus.

In another embodiment of the invention, as shown in FIGS. 1, 12, and 13, the compensating apparatus 50 further includes a moveable support of the dispenser 10 and the dispensing nozzle assembly 20 upon the platform 51 which is rigidly fixed to the rigid base support 62. The dispensing nozzle assembly 20 is configured to move in the X and Y directions, respectively, along respective rollers and rails. FIGS. 12 and 13 show the dispensing nozzle assembly 20, rollers and rails without the platform 51. The dispensing nozzle assembly 20 is attached at a lower portion, on opposite sides of the bearing housing 35, to a pair of lateral roller blocks 84, each roller block 84 have outwardly-facing series of roller wheels 86. A pair of opposed rails 82 oriented in the X direction, are positioned on opposite sides of the dispensing nozzle assembly 20, with the tracks facing inwardly toward the other, to engage therein the wheels 86 of the roller blocks 84, for enabling movement of dispensing nozzle assembly 20 relative the platform 51 in the X direction. The first ends of the two rails 82 are affixed to opposite ends of a first longitudinal roller block 83, while the second ends of the two rails 82 are affixed to opposite ends of a second longitudinal roller block 83. Each longitudinal roller block 83 has an outwardly-facing series of roller wheels 85, which engage inwardly-facing tracks of a pair of opposed rails 81 oriented in the Y direction, for enabling movement of dispensing nozzle assembly 20 relative the platform 51 in the Y direction. Generally, the engagement of the wheels 85,86 with the rails 81,82 provides low or nil frictional movement of the dispensing nozzle assembly 20 in the X,Y directions. As shown in FIG. 1, the opposed rails 81 oriented in the Y direction are affixed on, and extend along, the inside of opposite sidewalls of the platform 51. The roller blocks, wheels and rails (the slides) are configured for carrying heavy equipment weights of varying dispenser equipment, and are very low friction to facilitate very smooth, easy movement of the dispensing nozzle assembly 20.

Figure 15:
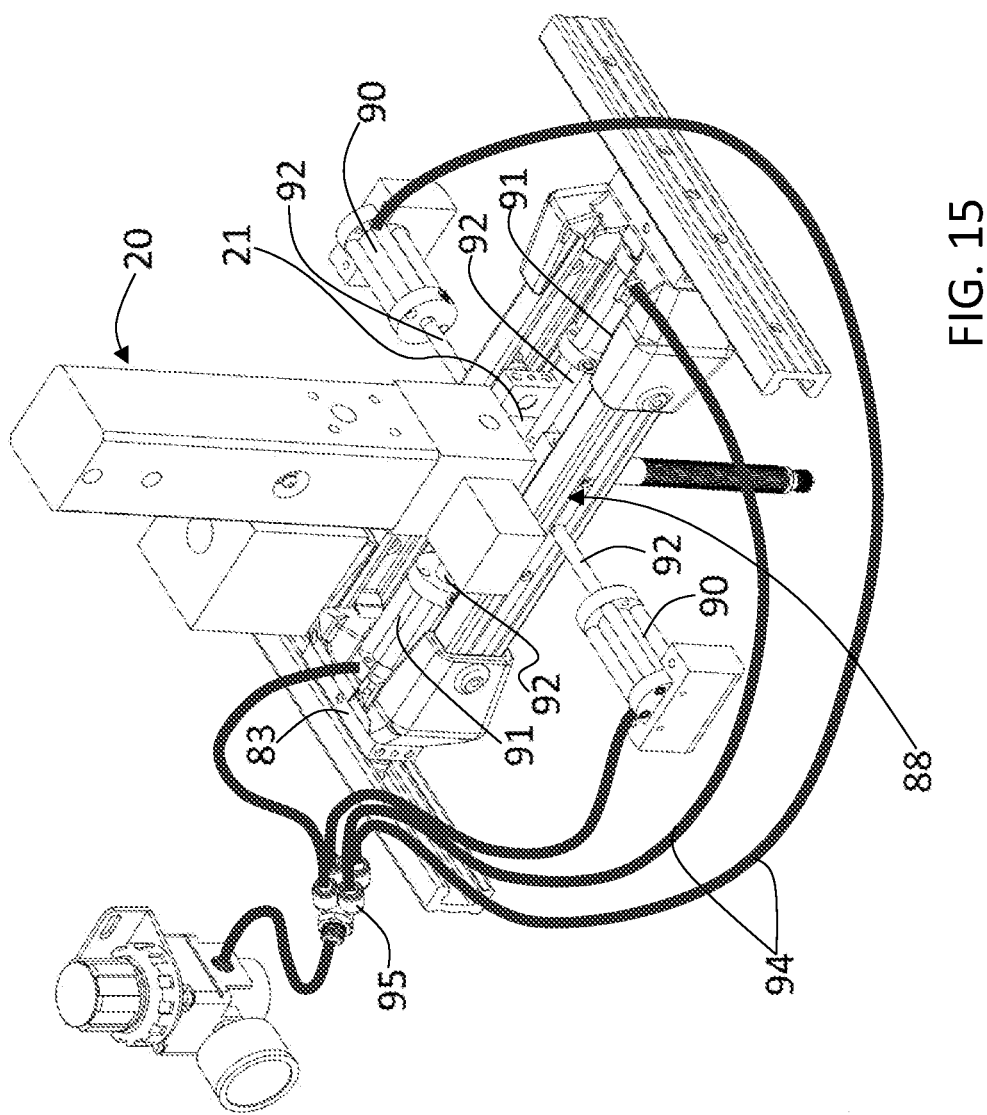
FIG. 15 shows a pneumatic stabilizing system for the dispensing nozzle assembly.
Figure 14:
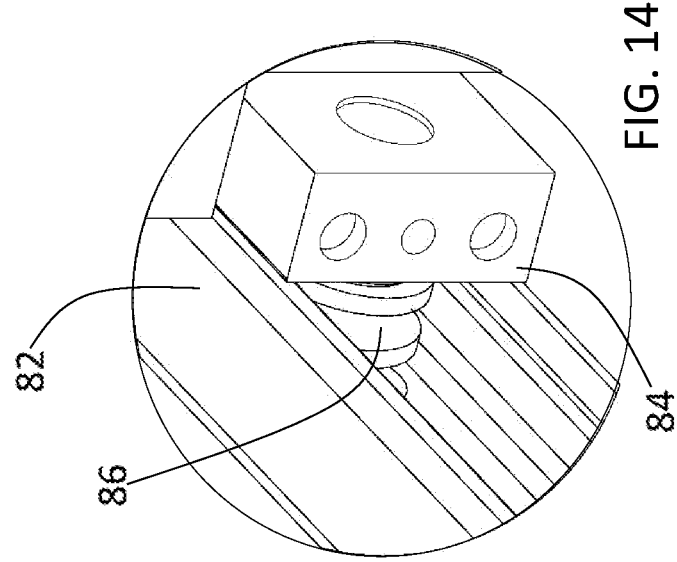
FIG. 14 shows a detailed view of a lateral roller block shown in FIG. 12.

Notwithstanding, during normal operation of the dispenser 10, the dispensing nozzle assembly 20 is intended to remain stationary in the X-Y plane relative to the platform 51, at a home or neutral position relative to the platform 51, to ensure high accuracy of the movement of the nozzle 26 and correspondingly of the application of the flowable material. FIG. 15 shows a stabilizing system, to maintain the dispensing nozzle assembly 20 in its home or neutral operational position, by applying a stabilizing force against the dispensing nozzle assembly 20 from each of four quadrants, including two opposed forces applied along the Y direction, and two opposed forces applied along the X direction. Each opposing pair of quadrant force are applied along a common axis that passes through the axial centerline of the nozzle 26, to avoid torqueing of the dispensing nozzle assembly 20 within the X-Y plane. Each of the forces are configured to apply the same, constant amount of force, to maintain the position of the dispensing nozzle assembly 20 and the nozzle 26, relative to the platform 51.

In an embodiment of the invention, the forces are applied using a pressurized cylinder fixed in a lateral orientation against a portion of the dispensing nozzle assembly 20, with the extending push rod 92 affixed to the dispensing nozzle assembly 20. In the illustrated embodiment, a first pair of opposed pressurized cylinders 90 are fixed to the platform 51 with their respective push rods 92 extending in the Y direction. A distal end of the pair of push rods 92 extends inwardly and coaxially along an axis that passes through the axial centerline of the nozzle tube 23, passing through a slot 88 in the respective opposed rail 82, and are fixed to the union housing 21. Similarly, a second pair of opposed pressurized cylinders 91 are fixed to a center portion of the respective roller block 83 on opposite sides of the dispensing nozzle assembly 20, with a distal end of their respective push rods 92 extending in the X direction inwardly and coaxially, along an axis that passes through the axial centerline of the nozzle tube 23, and fixed to the union housing 21.

A single self-relieving pressure regulator 97 provides through a pneumatic supply hose 96 a constant, even pressure to a four-way splitting manifold 95, and each leg of the four-way splitting manifold is connected pneumatically though pneumatic distribution hoses 94 to each of the four cylinders 90,91. The use of the four cylinders 90,91 applying an equal and opposed contact force from the four quadrants, push the nozzle 26 to a repeatable home or neutral location, smoothly and with even pressure (or force) throughout the entire stroke along each member 3. This method is preferred over the use of four springs as the force along the cylinder does not progressively add, or reduce, force with an extension, or reduction, in distance, as does the spring rate of a mechanical spring, and as these is less of a wear factor.

s a result, when the rotatable outer tube 30 moving in the X-Y plane along a side member 3 engages an obstruction, such as the upright surface 4 of one of the perpendicular side members 8 of the frame 2, or a portion of the table 75, the force exerted upon the rotatable outer tube 30 in the direction, opposite the moving direction, forces the union housing 21 toward the respective cylinder 90 or 91, which temporarily displaces the dispenser 10 from the home or neutral position, and provides increased resistance to the directional movement. When the rotatable outer tube 30 is reversed in the opposite direction, the cylinders 90,91 return the dispenser 10 to the home or neutral position.

In another embodiment of the invention, the apparatus provides a means for preventing the dispenser 10 from proceeding in a direction within the X-Y plane, after the distal end of the rotating nozzle assembly has engaged an obstruction that causes a hard-stop of the rotating nozzle assembly, and prevents the rotating nozzle assembly from over-travel, or further movement in the same direction, in order to avoid damaging the nozzle 26 or the nozzle tube 23. In such case, further movement in the direction is halted, and typically the direction of movement of the dispenser 10 is effected in the opposite direction, to move the nozzle away from the obstruction.

The invention utilizes a sense of touch, by the outer nozzle 30, to relay unchanging repeatable sight or proximity sensors.

Figure 16:
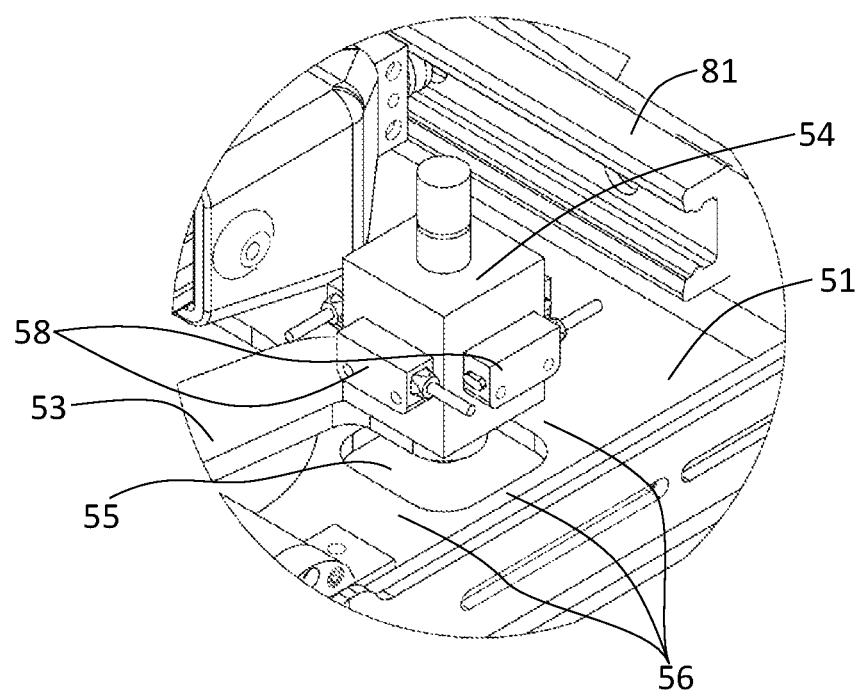
FIG. 16 shows an optical detecting device to detect over-travel of the rotating nozzle assembly.
Figure 17:
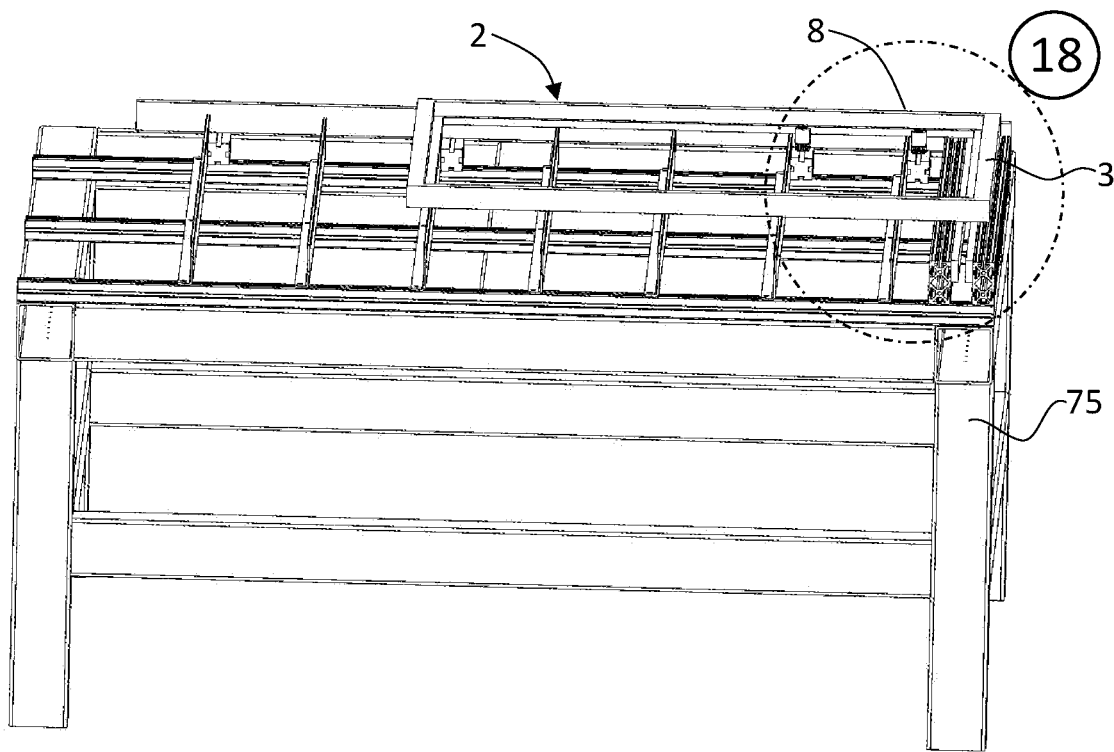
FIG. 17 shows front perspective view of a frame position on a support table.
Figure 18:
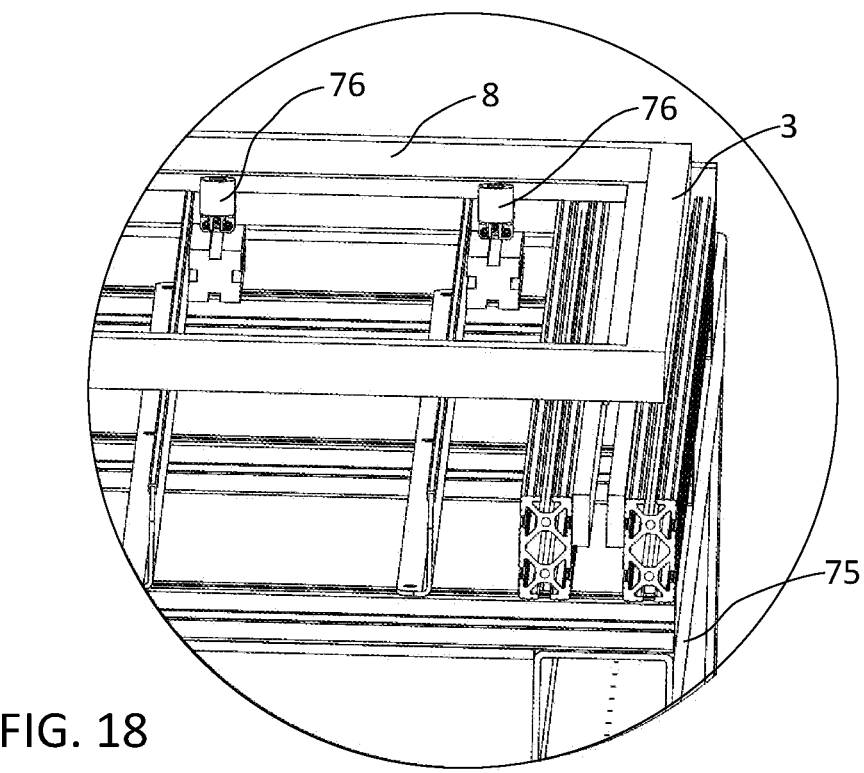
FIG. 18 shows a detailed view of the frame on a support table shown in FIG. 17, and non-marring clamp pads or spools for securing the frame.
Figure 19:
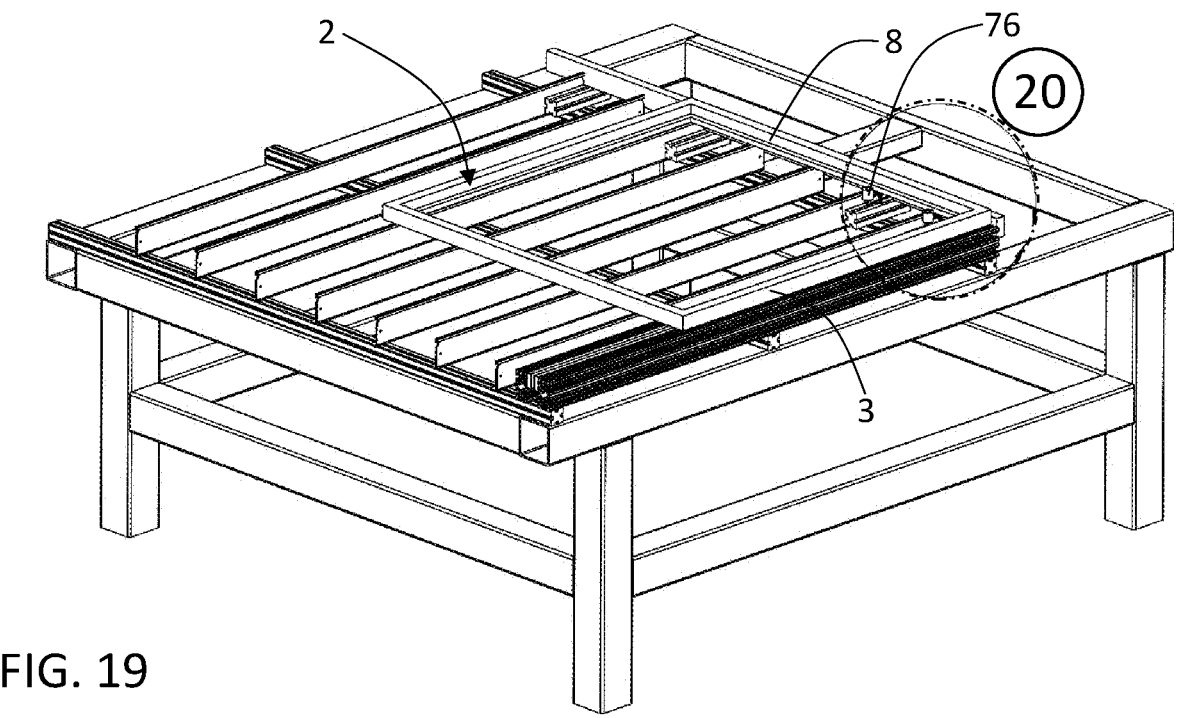
FIG. 19 shows front and right-side perspective view of the frame and support table.
Figure 20:
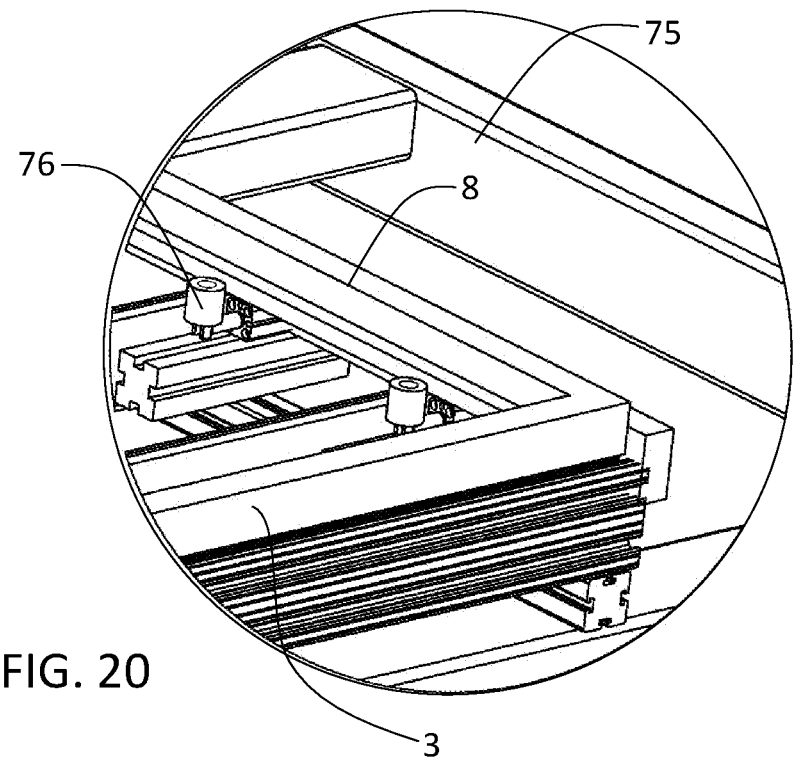
FIG. 20 shows a detailed view of the frame on a support table shown in FIG. 19, with the non-marring clamp pads in a clamping position against the frame.

One such means is illustrated in FIG. 16 (as well as FIG. 1), where an optical detecting device 54 is supported from a bracket arm 53 that extends from the platform 51. In a first embodiment, the optical detecting device 54 positioned over a shaped opening 55 formed into the floor of the platform 51, illustrated as a rectangular or square opening 55. The optical detecting device 54 includes two pairs of opposed down-looking optical sensors 58, each positioned, in the home or neutral position of the dispenser 10, to direct the optical sensing down at the surfaces 56 of the floor of the platform 51 in-board the edges that define the shaped opening 55. Each down-looking optical sensors 58 can read over-travel of the rotating nozzle assembly by sensing when the dispenser 10 is displaced from its home position, which corresponding displaces one of the sensors 58 from directly over the surface 56 of the platform 51 surrounding the shaped opening 55, whereby such optical sensors 58 will detect optically a portion of the shaped opening 55, instead of the surface 56 of the platform 51 surrounding the corresponding edge for the opening 55.

In an alternative embodiment, illustrated in FIG. 3, an optical detector device can include a single optical sensor 46 that is positioned and secured directly above the shaped opening 55, and is configured to detect downward and only through the space of the shaped opening when the dispenser 10 is in its neutral or home position. The down-looking optical sensor 46 can read over-travel of the rotating nozzle assembly by sensing when the dispenser 10 is displaced from its home position, which corresponding displaces the optical sensor 46 from the position directly above the shaped opening 55, to a position that is directly over the surface 56 surrounding the shaped opening 55. The optical sensor 46 detects optically the surface 56 surrounding the shaped opening 55, over which the detector 46 has been laterally displaced.

The sensors 58 can be wired in a dark operate mode for power safe failure. The design of these sensors read the same target and background, and have extremely high reliability of sensing, unlike other optical sensors for frames that have problems with color, sheen, backgrounds, sensor adjustments, etc. and result in frequent breaking of nozzles.

In another embodiment of the invention shown in FIGS. 17, 18, 19 and 20, the table 75 for holding and securing a frame 2 employs a system and method comprising the use of non-marring clamp pads or spools, positioned on adjustable or retractable clamping levers 76. A clamping system and method exerts a prescribed force upon the frame in the X and Y directions, to prevent dragging or excessive bending of the frame, though not such a force that can produce excessive force or pressure as to dent or mark the frame 3. The clamping levers 76 also can retract, out of the way of the side members of the frame 3, for non-intrusive loading and unloading of frames.

An optical detecting device or optical sensor as described herein can include a device for detector for measuring a distance optically from the device, by well-known means. Examples of distance detecting devices or sensors can include, without limitation, a doppler-effect sensor and a laser pulse sensor.

Figure 21:
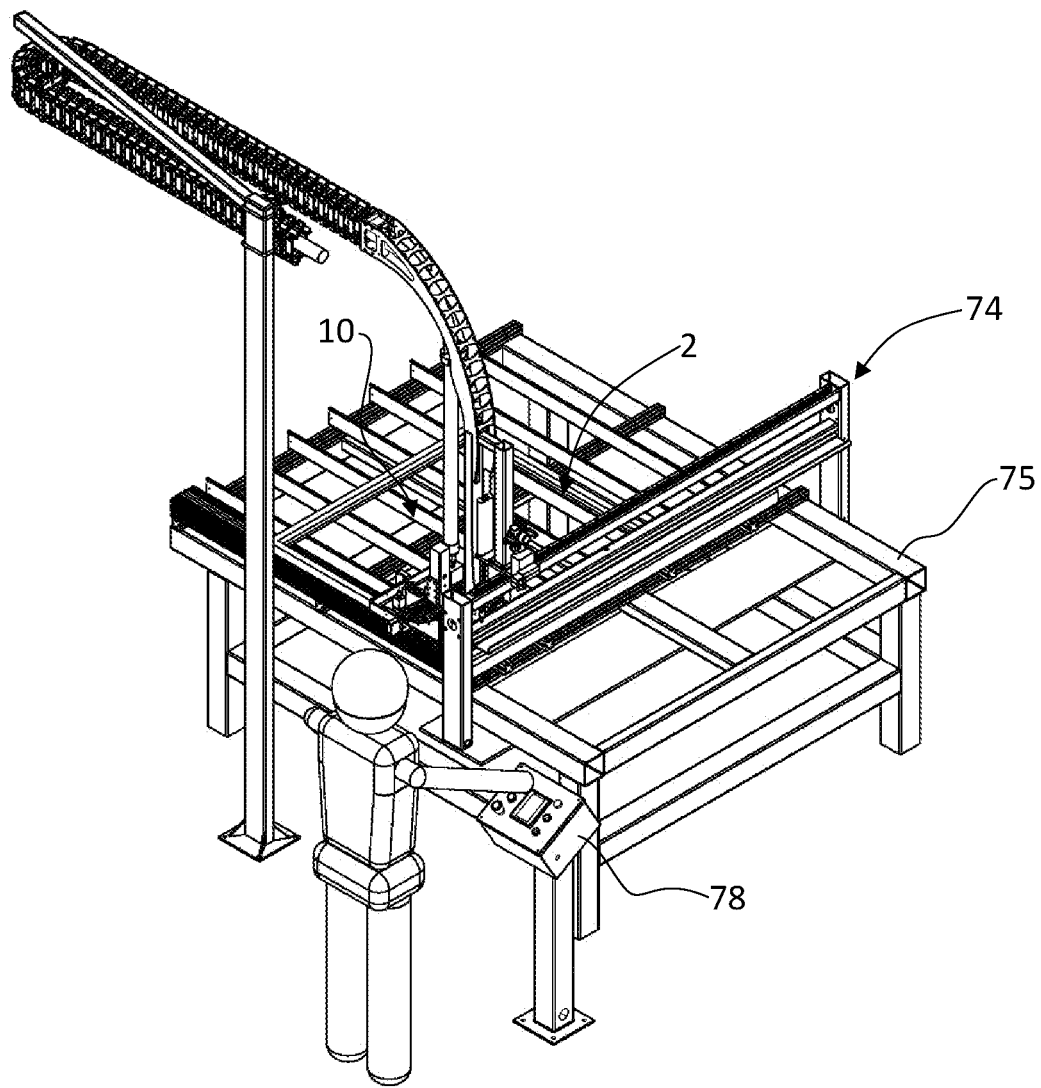
FIG. 21 shows the dispensing system in use of an automated movement system.

The sealant and adhesive dispensing system of the present invention can be adapted to support a variety of equipment modes. for dispensing adhesive and sealants to frames:

Automatic Table Equipment:

FIG. 21 illustrates the use of dispensing system where the adhesive (or sealant) application path is determined by means of mechanical (motor) drives of an automated movement system 74 that are controlled by a PLC (Programmable Logic Controller), which move the dispenser 10 around the periphery of the frame 2 positioned and secured to a table 75.

Figure 25:
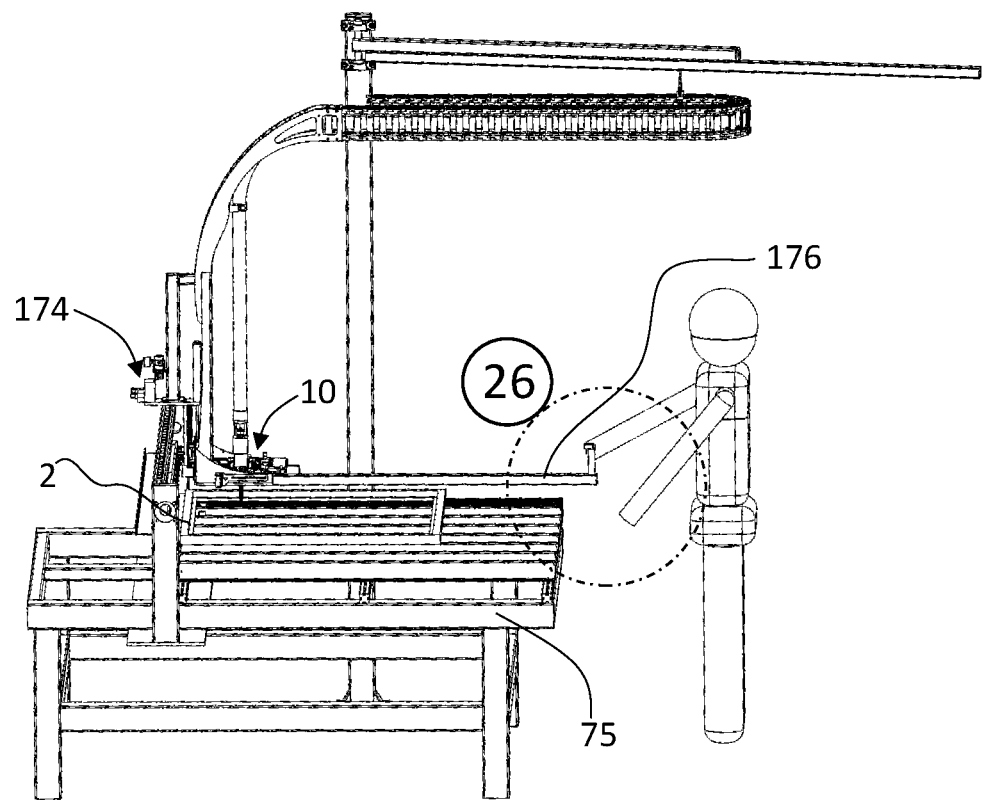
FIG. 25 illustrates an operator manually controlling the dispenser using manual movement system, against a frame positioned on a table.
Figure 26:
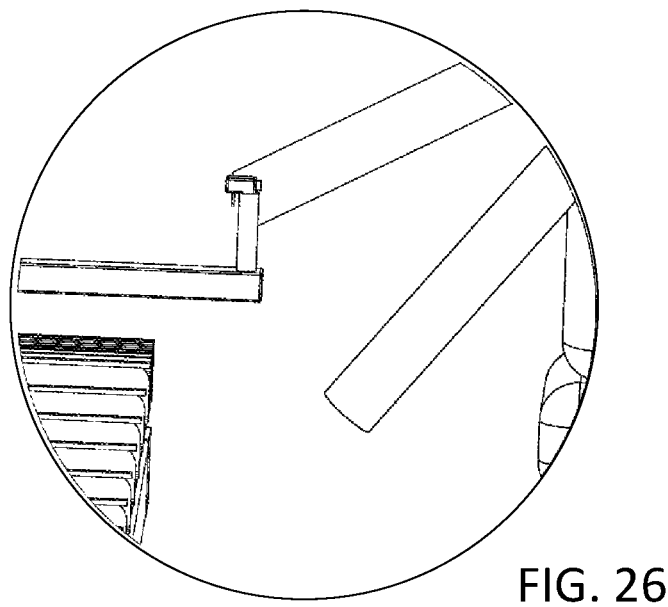
FIG. 26 shows a detailed view of the operator manipulating a manual implement shown in FIG. 25 to operate the manual movement system.

Manual Table Equipment:

FIGS. 25 and 26 illustrate the use of dispensing system 10 where an operator controls manually the dispenser 10, using a manual implement 176 of a manual movement system 174, around the periphery of a frame 2 positioned and secured to a table 75.

Figure 27:
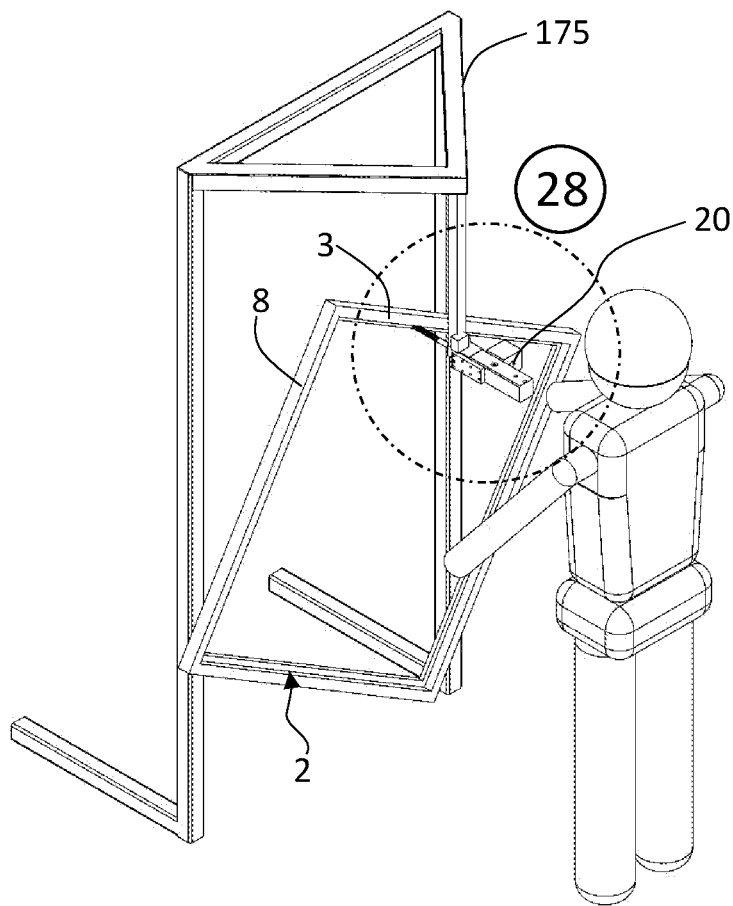
FIG. 27 illustrates a stationary dispensing nozzle assembly, with an operator maneuvering the frame over the rotating nozzle.
Figure 28:
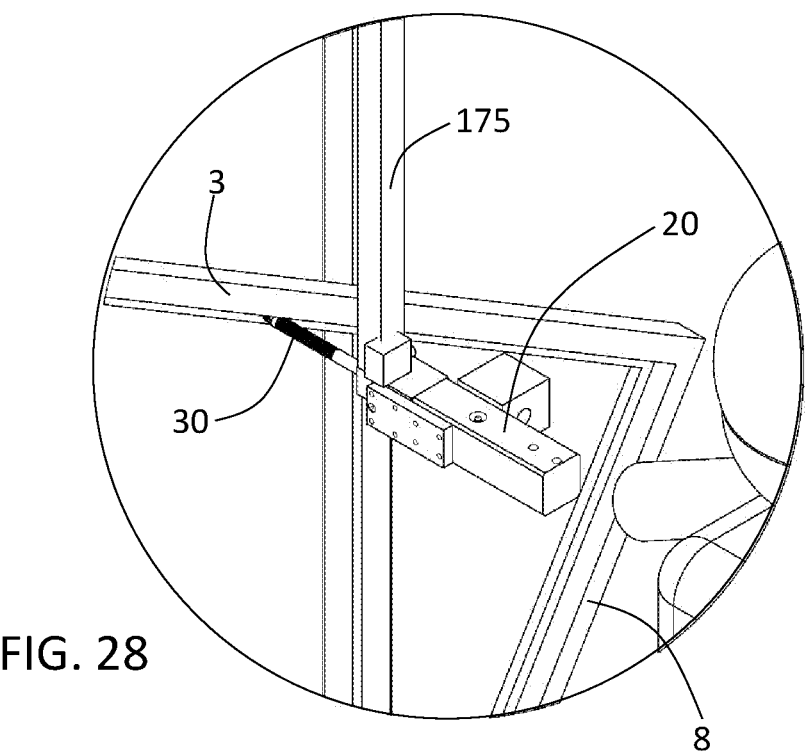
FIG. 28 shows a detailed view of the operator maneuvering the frame over the rotating nozzle, shown in FIG. 27.
Figure 29:
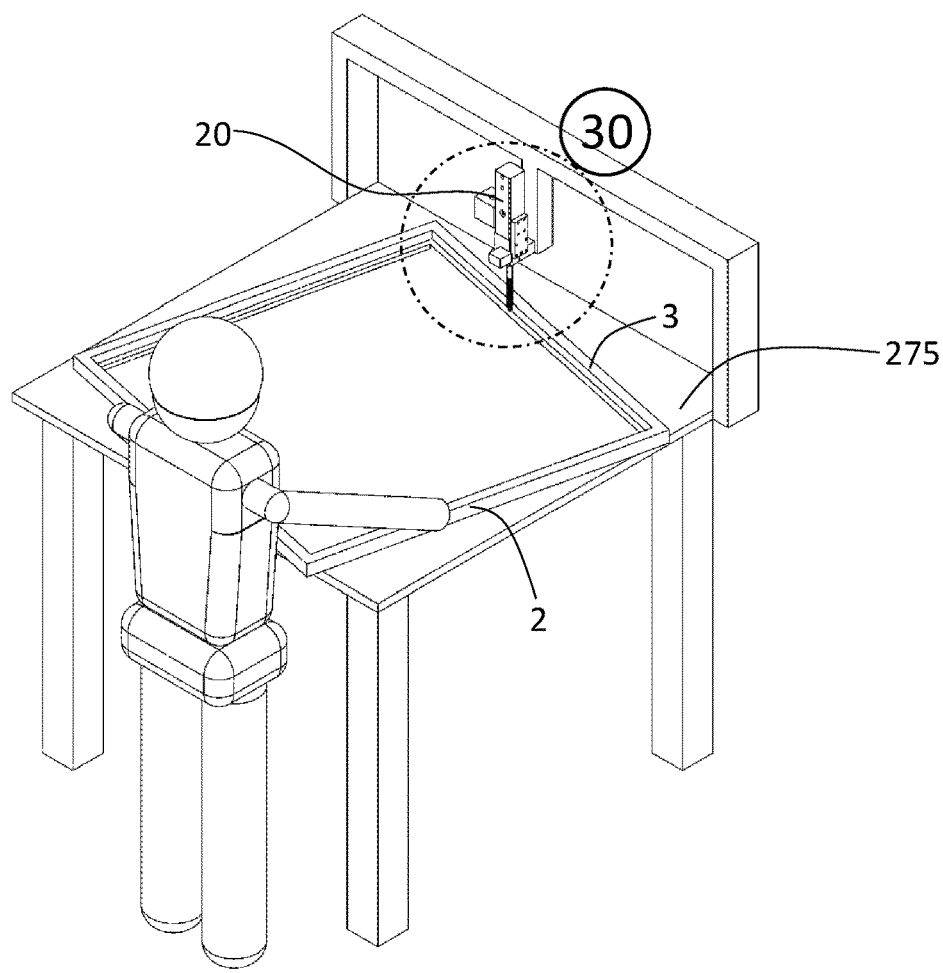
FIG. 29 illustrates a dispensing nozzle assembly secured in a stationary position over a surface, and an operator maneuvering the frame under the rotating nozzle.
Figure 30:
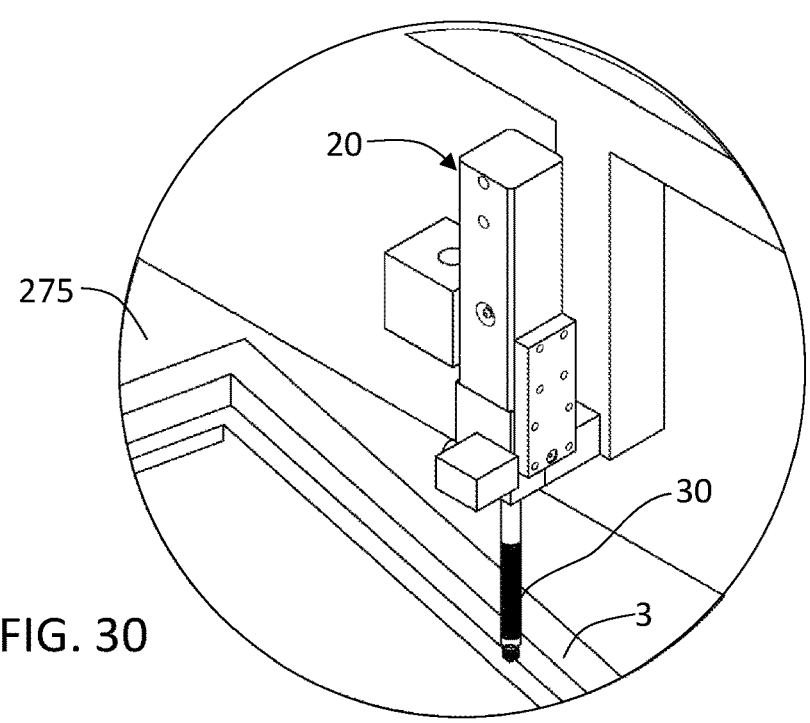
FIG. 30 shows a detailed view of the operator maneuvering the frame under the rotating nozzle, shown in FIG. 29.

Manipulated Frame on Fixed Dispenser:

FIGS. 27 and 28 illustrate a dispensing nozzle assembly 20 secured in a stationary position by a frame 175, where an operator maneuvers the frame 2 over the rotating nozzle 30. The force of the frame 2 against the rotating nozzle 30 is determined by the gravitational force of the frame 2 in a vertical position. FIGS. 29 and 30 illustrate a dispensing nozzle assembly 20 secured in a stationary position over a surface 275, where an operator maneuvers the frame 2 under the rotating nozzle 30. The force of the frame 2 against the rotating nozzle 30 is determined by the feel of the operator.

Both methods for a Manipulated Frame on a Fixed Dispenser require corner turning sensing (vertical or horizontal) so that material is not dispensed while the frame 2 is rotated about its corner when maneuvering from one side member 3 to the adjacent side member 8, to prevent dispensing excessive material into the corners of the frame 2.

Figure 31:
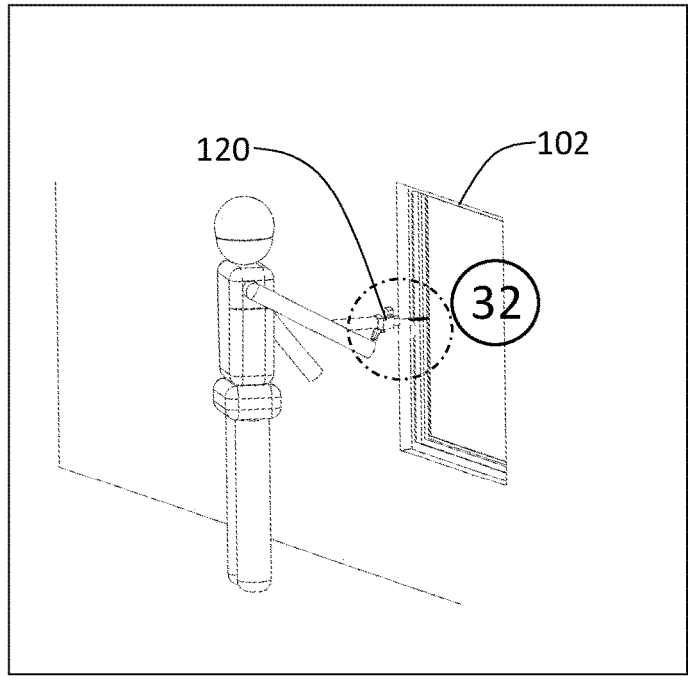
FIG. 31 illustrates a permanently-place window frame being manually caulked by an operator using a hand-held dispensing nozzle assembly with an electronically-operated metering caulking gun.
Figure 32:
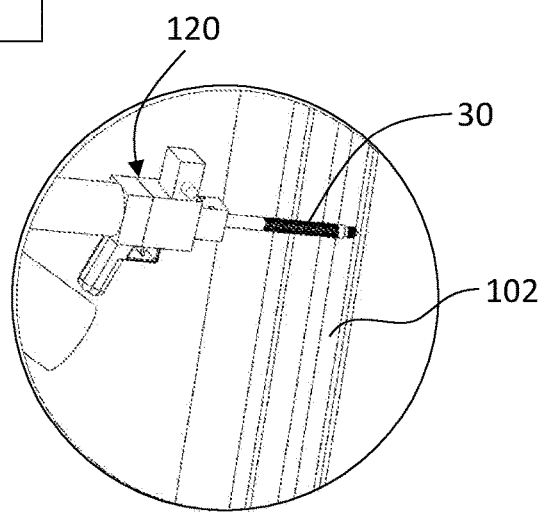
FIG. 32 shows a detailed view of the operator maneuvering the hand-held dispensing nozzle assembly around the window frame, shown in FIG. 32.
Figure 33:
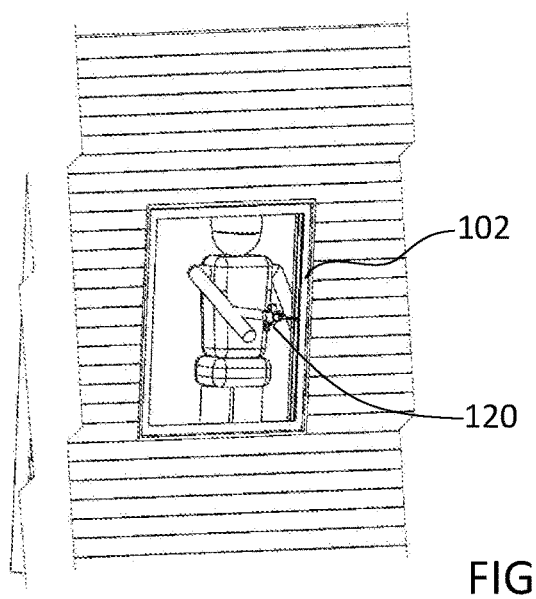
FIG. 33 shows the operator, window frame, and hand-held dispensing nozzle assembly of FIG. 31, from the other side of the window frame.

Fully Manual:

FIGS. 31-33 illustrate a fixed or permanently-place frame (e.g., a door frame or window frame) is manually caulked by an operator using hand-eye. As shown, an operator uses a dispensing nozzle assembly as an electronically-operated metering caulking gun 120, to run a bead of sealant, such as caulk, around the periphery of a window frame 102. The outer tube 30 run along the periphery, thereby rotating to provide speed input to the metering caulking gun 120. Doors, bath tubs, cabinets, counters and the like which are caulked commercially could use this aspect of the invention.

Having described the invention in one or more embodiment, it should be clear that modifications can be made without departing from the spirit of the invention. It is not intended that the words used to describe the invention nor the drawings illustrating the same be limiting on the invention.

I claim:

1. A dispensing nozzle assembly for dispensing a flowable liquid through a nozzle, the dispensing nozzle assembly including a rotating tube assembly, comprising:
   i) a nozzle coupling for supplying the flowable liquid, the nozzle coupling including a securing means,
   ii) a nozzle tube comprising a cylinder having an inlet end and an outlet end, the inlet end comprising a mating securing means for mating with and sealingly connecting to the securing means of the nozzle coupling,
   iii) a dispensing nozzle attached to the outlet end of the nozzle tube,
   iv) a union housing secured to the nozzle coupling, the union housing having a top opening through which the nozzle coupling extends, and an interior space that accepts and surrounds the nozzle coupling,
   v) a rotatable outer tube comprising a cylinder that surrounds the nozzle tube to provide the rotating tube assembly, the rotatable outer tube having an inlet end that extends into the union housing, and an outlet end that extends proximate the outlet end of the nozzle tube,
   vi) a means for rotatably securing the position of the inlet end of the rotatable outer tube within the union housing that is configured for low-friction rotation of the rotatable outer tube relative to the union housing.

2. The dispensing nozzle assembly according to claim 1, wherein the means for rotatably securing comprises a pair of spaced-apart, axially-aligned shaft bearings that are affixed to the rotatable outer tube proximate the inlet end of the rotatable outer tube.

3. The dispensing nozzle assembly according to claim 1, wherein the rotating tube assembly provides an annular gap along an entire length of the rotatable outer tube between an outer surface of the nozzle tube and an inner surface of the rotatable outer tube, and defines an annular inlet in communication through the annular gap with an opposed annular outlet at the outlet end of the rotatable outer tube, and wherein the annular inlet is in communication with the interior space of the union housing.

4. The dispensing nozzle assembly according to claim 3, wherein the union housing further includes an outer wall having an inlet port for a heating fluid, preferably heated air, in communication with the interior space of the union housing, wherein the annular gap provides a passageway for passing the heating fluid for heating the nozzle tube and a flowable liquid passing through the nozzle tube to the nozzle.

5. The dispensing nozzle assembly according to claim 1, wherein the rotatable outer tube has a rigidity sufficient to withstand lateral forces that may impact the rotatable outer tube.

6. The dispensing nozzle assembly according to claim 1, further including a non-contact velocity sensor for detecting a rotational speed of the rotatable outer tube.

7. The dispensing nozzle assembly according to claim 6, wherein an outer surface of the inlet end of the rotatable outer tube includes one marking, or more than one equally-spaced-apart markings, and wherein the non-contact velocity sensor includes an optical detector configured to read an outer surface of the inlet end of the rotatable outer tube to detect the rate of movement of the one or more markings past a fixed optical point or position.

8. The dispensing nozzle assembly according to claim 1, wherein an outer surface at the outlet end of the rotatable outer tube defines a radius distance that defines a distance at which the nozzle will apply the flowable material onto an application surface, the distance spaced away from a congruent upright surface, wherein the outlet end of the rotatable outer tube contacts and rotates along the congruent upright surface during movement of the nozzle along the application surface.

9. The dispensing nozzle assembly according to claim 8, wherein the outer surface at the outlet end of the rotatable outer tube comprises a frictional material applied to the outlet end of the rotatable outer tube, the frictional material selected to prevent scratching, marring, or denting of the congruent upright surface with which outlet end of the rotatable outer tube makes contact.

10. The dispensing nozzle assembly according to claim 9, wherein the frictional material comprises a removable or replaceable sleeve, and comprises a resilient, compressible material selected from the group consisting of natural rubber, synthetic rubber, and silicon.

11. The dispensing nozzle assembly according to claim 2, wherein an outer surface of the inlet end of the rotatable outer tube includes one marking, or more than one equally-spaced-apart markings, for use in detecting a rate of movement of the one marking or more than one markings past a fixed optical point or position.

12. The dispensing nozzle assembly according to claim 3, wherein an outer surface of the inlet end of the rotatable outer tube includes one marking, or more than one equally-spaced-apart markings, for use in detecting a rate of movement of the one marking or more than one markings past a fixed optical point or position.

13. The dispensing nozzle assembly according to claim 2, wherein an outer surface at the outlet end of the rotatable outer tube comprises a frictional material applied to the outlet end of the rotatable outer tube.

14. The dispensing nozzle assembly according to claim 13, wherein the frictional material comprises a removable or replaceable sleeve comprised of a resilient, compressible material selected from the group consisting of natural rubber, synthetic rubber, and silicon.

15. The dispensing nozzle assembly according to claim 3, wherein an outer surface at the outlet end of the rotatable outer tube comprises a frictional material applied to the outlet end of the rotatable outer tube.

16. The dispensing nozzle assembly according to claim 15, wherein the frictional material comprises a removable or replaceable sleeve comprised of a resilient, compressible material selected from the group consisting of natural rubber, synthetic rubber, and silicon.

17. The dispensing nozzle assembly according to claim 2, wherein the rotatable outer tube has a rigidity sufficient to withstand lateral forces that may impact the rotatable outer tube.

18. The dispensing nozzle assembly according to claim 3, wherein the rotatable outer tube has a rigidity sufficient to withstand lateral forces that may impact the rotatable outer tube.

* * * * *